(12) United States Patent
Horii et al.

(10) Patent No.: US 7,032,046 B2
(45) Date of Patent: Apr. 18, 2006

(54) RESOURCE MANAGEMENT DEVICE FOR MANAGING ACCESS FROM BUS MASTERS TO SHARED RESOURCES

(75) Inventors: Seiji Horii, Osaka (JP); Yuji Takai, Osaka (JP); Takahide Baba, Hyogo (JP); Yoshiharu Watanabe, Kyoto (JP); Daisuke Murakami, Kyoto (JP); Tetsuji Kishi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 309 days.

(21) Appl. No.: 10/673,191

(22) Filed: Sep. 30, 2003

(65) Prior Publication Data

US 2004/0073730 A1 Apr. 15, 2004

(30) Foreign Application Priority Data

Sep. 30, 2002 (JP) ............................. 2002-284770
Jan. 23, 2003 (JP) ............................. 2003-014590

(51) Int. Cl.
*G06F 13/36* (2006.01)
(52) U.S. Cl. ...................... 710/113; 710/241; 711/150
(58) Field of Classification Search ........ 710/113–125, 710/309–312, 240–244, 110; 709/104; 711/167–168, 711/150
See application file for complete search history.

(56) References Cited

U.S. PATENT DOCUMENTS

| 5,533,205 | A | | 7/1996 | Blackledge, Jr. et al. |
| 5,619,661 | A | * | 4/1997 | Crews et al. ............... 710/119 |
| 5,640,600 | A | * | 6/1997 | Satoh et al. ................. 710/33 |
| 5,931,924 | A | | 8/1999 | Arimilli et al. |
| 5,948,089 | A | | 9/1999 | Wingard et al. |
| 6,070,205 | A | | 5/2000 | Kato et al. |
| 6,073,199 | A | * | 6/2000 | Cohen et al. ............... 710/113 |
| 6,138,200 | A | * | 10/2000 | Ogilvie ....................... 710/244 |
| 6,321,284 | B1 | * | 11/2001 | Shinohara et al. .......... 710/113 |
| 6,523,077 | B1 | * | 2/2003 | Kusaka ....................... 710/305 |
| 6,892,289 | B1 | * | 5/2005 | Moss ......................... 711/167 |
| 6,910,088 | B1 | * | 6/2005 | LaBerge ..................... 710/117 |
| 2002/0126660 | A1 | | 9/2002 | Watanabe et al. |

FOREIGN PATENT DOCUMENTS

JP 52-103935 8/1977

* cited by examiner

*Primary Examiner*—Rehana Perveen
*Assistant Examiner*—Raymond N Phan
(74) *Attorney, Agent, or Firm*—McDermott Will & Emery LLP

(57) ABSTRACT

A resource management device of the present invention, used in a system where at least one bus master is connected to each of a plurality of buses, includes: a bus arbitration section for arbitrating an amount of access to be made from the buses to a shared resource; an arbitration information management section for managing, as bus arbitration information, a bus priority order and a highest access priority pattern for ensuring a predetermined access bandwidth to the shared resource for each bus for an arbitration operation by the bus arbitration section; and a resource control section for controlling, based on characteristics of the shared resource, an access to the shared resource from the bus whose access request has been granted by the bus arbitration section. Thus, it is possible to guarantee a minimum bandwidth for access to the shared resource for each of the plurality of bus masters.

23 Claims, 25 Drawing Sheets

FIG. 3

| | 0 | 1 | 2 | 3 | 4 | 5 | 6 | 7 | 8 | 9 | ACCESS PERMISSION PERCENTAGE |
|---|---|---|---|---|---|---|---|---|---|---|---|
| BUS 0 | 1 | 0 | 0 | 1 | 0 | 0 | 0 | 1 | 0 | 0 | 30% |
| BUS 1 | 0 | 1 | 0 | 0 | 1 | 1 | 0 | 0 | 1 | 1 | 50% |
| BUS 2 | 0 | 0 | 1 | 0 | 0 | 0 | 1 | 0 | 0 | 0 | 20% |

201

PRIORITY ORDER AMONG BUSES: HIGH → LOW

FIG. 7

| | | | | | | | | | | | ACCESS PERMISSION PERCENTAGE |
|---|---|---|---|---|---|---|---|---|---|---|---|
| BUS 0 (R) | 0 | 1 | 0 | 0 | 0 | 0 | 0 | 0 | 0 | 0 | 10% |
| BUS 0 (W) | 1 | 0 | 0 | 1 | 0 | 0 | 0 | 1 | 0 | 0 | 20% |
| BUS 1 (R) | 0 | 0 | 0 | 0 | 0 | 1 | 0 | 1 | 0 | 1 | 30% |
| BUS 1 (W) | 0 | 1 | 0 | 0 | 1 | 0 | 0 | 0 | 0 | 0 | 20% |
| BUS 2 (R) | 0 | 0 | 0 | 0 | 0 | 0 | 1 | 0 | 1 | 0 | 10% |
| BUS 2 (W) | 0 | 0 | 1 | 0 | 0 | 0 | 0 | 0 | 0 | 0 | 10% |

601

PRIORITY ORDER AMONG BUSES: HIGH → LOW

FIG. 9

Table 901:

| | 0 | 1 | 2 | 3 | 4 | 5 | 6 | 7 |
|---|---|---|---|---|---|---|---|---|
| BUS MASTER A | 1 | 1 | 0 | 1 | 0 | 0 | 1 | 1 |
| BUS MASTER B | 0 | 0 | 1 | 0 | 1 | 1 | 1 | 0 |

902 — ACCESS PERMISSION PERCENTAGE FOR EACH BUS MASTER

| 50% |
|---|
| 50% |

Table 911:

| | 0 | 1 | 2 | 3 | 4 | 5 | 6 | 7 | 8 | 9 |
|---|---|---|---|---|---|---|---|---|---|---|
| BUS MASTER C | 1 | 0 | 1 | 1 | 0 | 0 | 1 | 1 | 0 | 0 |
| BUS MASTER D | 0 | 1 | 0 | 0 | 1 | 1 | 0 | 0 | 1 | 1 |

912 — ACCESS PERMISSION PERCENTAGE FOR EACH BUS MASTER

| 40% |
|---|
| 60% |

Table 921:

| | 0 | 1 | 2 | 3 | 4 | 5 | 6 | 7 | 8 | 9 |
|---|---|---|---|---|---|---|---|---|---|---|
| BUS 0 | 0 | 0 | 0 | 1 | 0 | 0 | 0 | 1 | 1 | 1 |
| BUS 1 | 0 | 1 | 0 | 0 | 1 | 1 | 0 | 0 | 0 | 0 |
| BUS 2 | 1 | 0 | 1 | 0 | 0 | 0 | 1 | 0 | 0 | 0 |

922 — ACCESS PERMISSION PERCENTAGE FOR EACH BUS

| 20% |
|---|
| 50% |
| 30% |

|  | 0 | 1 | 2 | 3 | 4 | 5 | 6 | 7 |
|---|---|---|---|---|---|---|---|---|
| BUS MASTER A | 1 | 0 | 0 | 1 | 0 | 0 | 0 | 0 |
| BUS MASTER B | 0 | 1 | 1 | 0 | 1 | 1 | 1 | 1 |

1002

| ACCESS PERMISSION PERCENTAGE FOR EACH BUS MASTER |
|---|
| 25% |
| 75% |

1011

|  | 0 | 1 | 2 | 3 | 4 | 5 | 6 | 7 | 8 | 9 |
|---|---|---|---|---|---|---|---|---|---|---|
| BUS MASTER C | 1 | 0 | 1 | 1 | 0 | 0 | 0 | 1 | 0 | 0 |
| BUS MASTER D | 0 | 1 | 0 | 0 | 1 | 1 | 1 | 0 | 1 | 1 |

1012

| ACCESS PERMISSION PERCENTAGE FOR EACH BUS MASTER |
|---|
| 40% |
| 60% |

1021

|  | 0 | 1 | 2 | 3 | 4 | 5 | 6 | 7 | 8 | 9 |
|---|---|---|---|---|---|---|---|---|---|---|
| BUS 0 | 0 | 0 | 0 | 1 | 0 | 0 | 1 | 1 | 0 | 1 |
| BUS 1 | 0 | 1 | 0 | 0 | 1 | 1 | 0 | 0 | 1 | 0 |
| BUS 2 | 1 | 0 | 1 | 0 | 0 | 0 | 0 | 0 | 0 | 0 |

1022

| ACCESS PERMISSION PERCENTAGE FOR EACH BUS |
|---|
| 40% |
| 40% |
| 20% |

| | 0 | 1 | 2 | 3 | 4 | 5 | 6 | 7 | 8 | 9 | ACCESS PERMISSION PERCENTAGE |
|---|---|---|---|---|---|---|---|---|---|---|---|
| BUS MASTER A-SHARED RESOURCE 719 | 1 | 0 | 0 | 1 | 0 | 0 | 1 | 0 | 0 | 0 | 30% |
| BUS MASTER B-SHARED RESOURCE 719 | 0 | 1 | 0 | 0 | 1 | 1 | 0 | 0 | 0 | 1 | 40% |
| BUS MASTER A-SHARED RESOURCE 734 | 0 | 0 | 1 | 0 | 0 | 0 | 0 | 0 | 1 | 0 | 20% |
| BUS MASTER B-SHARED RESOURCE 734 | 0 | 0 | 0 | 0 | 0 | 0 | 0 | 1 | 0 | 0 | 10% |

1302

| | 0 | 1 | 2 | 3 | 4 | 5 | 6 | 7 | 8 | 9 | ACCESS PERMISSION PERCENTAGE |
|---|---|---|---|---|---|---|---|---|---|---|---|
| BUS MASTER C-SHARED RESOURCE 719 | 0 | 0 | 0 | 1 | 0 | 0 | 1 | 0 | 0 | 0 | 20% |
| BUS MASTER D-SHARED RESOURCE 719 | 1 | 0 | 0 | 0 | 0 | 0 | 0 | 1 | 1 | 0 | 30% |
| BUS MASTER C-SHARED RESOURCE 734 | 0 | 0 | 1 | 0 | 0 | 0 | 0 | 0 | 0 | 0 | 10% |
| BUS MASTER D-SHARED RESOURCE 734 | 0 | 1 | 0 | 0 | 1 | 1 | 0 | 0 | 0 | 1 | 40% |

1303

| | 0 | 1 | 2 | 3 | 4 | 5 | 6 | 7 | 8 | 9 | ACCESS PERMISSION PERCENTAGE |
|---|---|---|---|---|---|---|---|---|---|---|---|
| BUS MASTER E-SHARED RESOURCE 719 | 0 | 1 | 0 | 1 | 0 | 1 | 1 | 0 | 0 | 1 | 50% |
| BUS MASTER E-SHARED RESOURCE 734 | 1 | 0 | 1 | 0 | 1 | 0 | 0 | 1 | 1 | 0 | 50% |

FIG. 16

| 1501 | 0 | 1 | 2 | 3 | 4 | 5 | 6 | 7 | 8 | 9 | ACCESS PERMISSION PERCENTAGE FOR EACH PROCESS |
|---|---|---|---|---|---|---|---|---|---|---|---|
| BUS MASTER A-PROCESS 1 | 1 | 0 | 0 | 1 | 0 | 0 | 1 | 0 | 0 | 0 | 30% |
| BUS MASTER A-PROCESS 2 | 0 | 1 | 1 | 0 | 1 | 0 | 0 | 0 | 0 | 1 | 30% |
| BUS MASTER B | 0 | 0 | 0 | 0 | 0 | 1 | 0 | 1 | 1 | 0 | 40% |

| 1801 | 0 | 1 | 2 | 3 | 4 | 5 | 6 | 7 | 8 | 9 | HIGH |
|---|---|---|---|---|---|---|---|---|---|---|---|
| BUS 0 | 0 | 0 | 0 | 1 | 0 | 0 | 0 | 1 | 0 | 0 | |
| BUS 1 | 1 | 1 | 0 | 0 | 1 | 1 | 1 | 0 | 1 | 1 | |
| BUS 2 | 0 | 0 | 1 | 0 | 0 | 0 | 0 | 0 | 0 | 0 | LOW PRIORITY ORDER AMONG BUSES |

| 1802 | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|---|---|---|---|---|---|---|---|---|---|---|---|---|---|---|
| BUS 0 | ① | 0 | 0 | ① | 0 | ① | 0 | 0 | 0 | ① | ① | 0 | 0 | ① | 0 | ① | 0 | 0 | ① | 0 | ① | 0 | 0 | 0 | ① | ① | 0 | 0 | ① | 0 |
| BUS 1 | 0 | 0 | 0 | 0 | ① | 0 | ① | 0 | 0 | 0 | 0 | ① | 0 | 0 | ① | 0 | 0 | ① | 0 | ① | ① | 0 | 0 | ① | 0 | 0 | 0 | ① | 0 | ① |
| BUS 2 | 0 | ① | 1 | 1 | 1 | 1 | 1 | ① | ① | 1 | 0 | 1 | ① | 1 | 1 | 1 | ① | ① | 0 | ① | 0 | ① | ① | ① | ① | 0 | ① | ① | 0 | 0 |

| 1803 | 0 | 1 | 2 | 3 | 4 | 5 | 6 | 7 | 8 | 9 |
|---|---|---|---|---|---|---|---|---|---|---|
| BUS 0 | 0 | 0 | 0 | 1 | 0 | 0 | 0 | 1 | 0 | 0 |
| BUS 1 | 1 | 1 | 0 | 0 | 1 | 1 | 1 | 0 | 1 | 1 |
| BUS 2 | 0 | 0 | 1 | 0 | 0 | 1 | 0 | 0 | 0 | 0 |

| | 0 | 1 | 2 | 3 | 4 | 5 | 6 | 7 | 8 | 9 | HIGH ▷ LOW PRIORITY ORDER AMONG BUSES |
|---|---|---|---|---|---|---|---|---|---|---|---|
| BUS 0 | 0 | 0 | 0 | 0 | 0 | 0 | 0 | 1 | 0 | 1 | |
| BUS 1 | 0 | 0 | 0 | 0 | 0 | 0 | 1 | 0 | 1 | 0 | |
| BUS 2 | 1 | 1 | 1 | 1 | 1 | 1 | 0 | 0 | 0 | 0 | |

1902

| | 0 | 1 | 2 | 3 | 4 | 5 | 6 | 7 | 8 | 9 | 10 | 11 | 12 | 13 | 14 |
|---|---|---|---|---|---|---|---|---|---|---|---|---|---|---|---|
| BUS 0 | ① | 0 | 0 | 0 | ① | 0 | 1 | ① | 0 | 0 | ① | ① | 0 | 0 | ① |
| BUS 1 | 1 | 1 | 1 | 1 | 1 | 1 | ① | 1 | ① | 0 | 1 | 1 | 1 | 1 | 1 |
| BUS 2 | 0 | 0 | 1 | ① | 0 | ① | 1 | 1 | 1 | ① | 0 | ① | ① | ① | 0 |

| | 15 | 16 | 17 | 18 | 19 | 20 | 21 | 22 | 23 | 24 | 25 | 26 | 27 | 28 | 29 |
|---|---|---|---|---|---|---|---|---|---|---|---|---|---|---|---|
| BUS 0 | 0 | ① | ① | 0 | 0 | ① | ① | 0 | 0 | ① | 0 | 1 | ① | 0 | 0 |
| BUS 1 | 1 | 1 | 1 | ① | 0 | 1 | 1 | 1 | 1 | 1 | 1 | ① | ① | 0 | 0 |
| BUS 2 | ① | 1 | 1 | 1 | ① | 0 | 0 | ① | ① | 0 | ① | 1 | 1 | 1 | ① |

1903

| | 0 | 1 | 2 | 3 | 4 | 5 | 6 | 7 | 8 | 9 |
|---|---|---|---|---|---|---|---|---|---|---|
| BUS 1 | 0 | 1 | 1 | 1 | 1 | 1 | 1 | 0 | 1 | 0 |
| BUS 2 | 0 | 1 | 1 | 1 | 1 | 1 | 0 | 0 | 0 | 0 |
| BUS 0 | 0 | 0 | 0 | 0 | 0 | 0 | 0 | 1 | 0 | 1 |

RESOURCE MANAGEMENT DEVICE FOR MANAGING ACCESS FROM BUS MASTERS TO SHARED RESOURCES

BACKGROUND OF THE INVENTION

The present invention relates to a resource management device for managing access from bus masters to a shared resource in a multi-bus-master/multi-bus data processing system in which at least one bus master is connected to each of a plurality of buses.

In a case where a plurality of bus masters share a resource via a common bus in a system LSI, it is necessary to efficiently arbitrate requests to access the resource. Herein, the bus master may be a microprocessor, a DSP (Digital Signal Processor), a DMA (Direct Memory Access) controller, etc., and the shared resource may be a memory, a peripheral I/O (input/output) controller, etc.

Japanese Laid-Open Patent Publication No. 52-103935 discloses a multi-processor system, in which a scan circuit issues access grant signals cyclically for granting access to the shared memory from each processor. The processor can access the shared memory when both an access request signal from the processor and the access grant signal from the scan circuit are active. Therefore, each processor can have chance to access the shared memory fairly.

U.S. Pat. No. 6,070,205 discloses a system for arbitrating use of the bus among a plurality of bus masters, in which a set of priority order information is provided, and the bus master to be granted use of the bus in the next cycle is determined according to the priority order information.

U.S. Pat. No. 5,931,924 discloses a data processing system, in which bus masters are randomly given the highest priority for accessing a shared resource.

U.S. Pat. No. 5,948,089 discloses a computer bus system, in which a synchronous bus is used in combination with a two-level arbitration scheme where the first level of arbitration is a framed, time-division-multiplexing arbitration scheme and the second level is a fairly-allocated round-robin scheme implemented using a token-passing mechanism.

U.S. Pat. No. 5,533,205 discloses a multimedia computer system, in which during selected time intervals the arbitration level indicators associated with a particular presentation devices are temporarily reordered to guarantee bus access at the required data rate.

SUMMARY OF THE INVENTION

In a multi-bus-master/multi-bus data processing system, at least one bus master is connected to each of a plurality of buses. Where the access of bus masters to a shared resource needs to be managed in a data processing system having such a complicated bus architecture, it is not possible, with the conventional techniques disclosed in the patent documents above, to realize access to the shared resource according to the characteristics thereof (e.g., the access characteristic of a memory), and it is not possible to guarantee a predetermined access bandwidth in terms of the amount of data transferred to the shared resource. Particularly, it is difficult, with the conventional techniques, to guarantee a minimum bandwidth for access to the shared resource or to optimize the latency (or delay) of access to the shared resource by each bus master according to the access status.

It is an object of the present invention to provide a resource management device capable of guaranteeing a minimum bandwidth for access to the shared resource for each bus master in a multi-bus-master/multi-bus data processing system.

It is also an object of the present invention to provide a resource management device capable of reducing the latency in accessing the shared resource for each bus master in a multi-bus-master/multi-bus data processing system.

In order to achieve these objects, the present invention provides a resource management device in a data processing system, in which at least one bus master is connected to each of a plurality of buses, with each bus master being connected to at least one shared resource via one of the plurality of buses, the resource management device including: a bus arbitration section for arbitrating an amount of access to be made from the plurality of buses to the shared resource; an arbitration information management section for managing, as bus arbitration information, a bus priority order and a highest access priority pattern for ensuring a predetermined access bandwidth to the shared resource for each of the plurality of buses for an arbitration operation by the bus arbitration section; and a resource control section for controlling, based on characteristics of the shared resource, an access to the shared resource from the bus whose access request has been granted by the bus arbitration section.

According to the present invention, the bus priority order, based on which a bus is selected among others, and the highest access priority pattern, which is arranged based on a unit time slot that corresponds to the temporal resolution of the resource access bandwidth to be guaranteed, are provided as the bus arbitration information. The bus arbitration information is independent of the individual buses, whereby the unit time slot, which corresponds to the temporal resolution of the access bandwidth to be guaranteed, can be determined according to the shared resource independently of the bus cycles of the individual buses, and thus is not influenced by the bus cycles of the individual buses.

A bus whose access request has been granted accesses the shared resource in a manner corresponding to the unit time slot at the access efficiency inherent to the resource. The amount of data to be transferred to a shared resource is determined by the access efficiency of each resource and the length of the unit time slot. While the data transfer capacity of each bus is dependent on the length of the bus cycle, the data transfer width, etc., of the bus, it is possible to guarantee an access bandwidth for each resource according to the access efficiency inherent to the resource.

In a case where a plurality of bus masters are connected to one of the plurality of buses, a bus master arbitration section is further provided for arbitrating bus requests from the plurality of bus masters. The arbitration information management section further has a function of managing, as bus master arbitration information, a bus master priority order and a highest access priority pattern for ensuring a predetermined access bandwidth to the shared resource for each of the plurality of bus masters for an arbitration operation by the bus master arbitration section.

In order to reduce the latency in accessing the shared resource, a learning section is further provided for, after the arbitration information management section initializes the bus arbitration information, obtaining arbitration results information for a predetermined number of arbitration operations by the bus arbitration section, analyzing a status of access to the shared resource based on the arbitration results information, and instructing the arbitration information management section to update the bus arbitration information so as to reduce a latency in accessing the shared resource based on the analysis.

BRIEF DESCRIPTION OF THE DRAWINGS

FIG. 3 illustrates bus arbitration information in FIG. 1 in the form of a table.

FIG. 7 illustrates a variation of the bus arbitration information of FIG. 3.

FIG. 9 illustrates an example of bus master arbitration information and bus arbitration information in FIG. 8 each in the form of a table.

FIG. 11 illustrates an example of bus master arbitration information and bus arbitration information obtained while taking into consideration the group information of FIG. 10.

FIG. 14 illustrates an example of bus master arbitration information corresponding to FIG. 13.

FIG. 16 illustrates an example of bus master arbitration information corresponding to FIG. 15.

FIG. 19 illustrates a case where the "multi-trial rule" is applied to the bus arbitration information in the resource management device of FIG. 17.

FIG. 21 illustrates a case where the "periodic rule" is applied to the bus arbitration information in the resource management device of FIG. 17.

FIG. 22 illustrates a case where the "temporary rule" is applied to the bus arbitration information in the resource management device of FIG. 17.

DETAILED DESCRIPTION OF THE INVENTION

Embodiments of the present invention will now be described with reference to the drawings. In the following descriptions, a bus master is assumed to have a function for actively sending signals for data access such as an address signal, control signals and the like. Each functional block usually has a plurality of interfaces for bus connections, some of which function as bus masters, and the others as bus slaves. A processor of Harvard architecture, for example, has a bus master for sending instructions and a bus master for sending data.

FIRST EMBODIMENT

Figure 1:
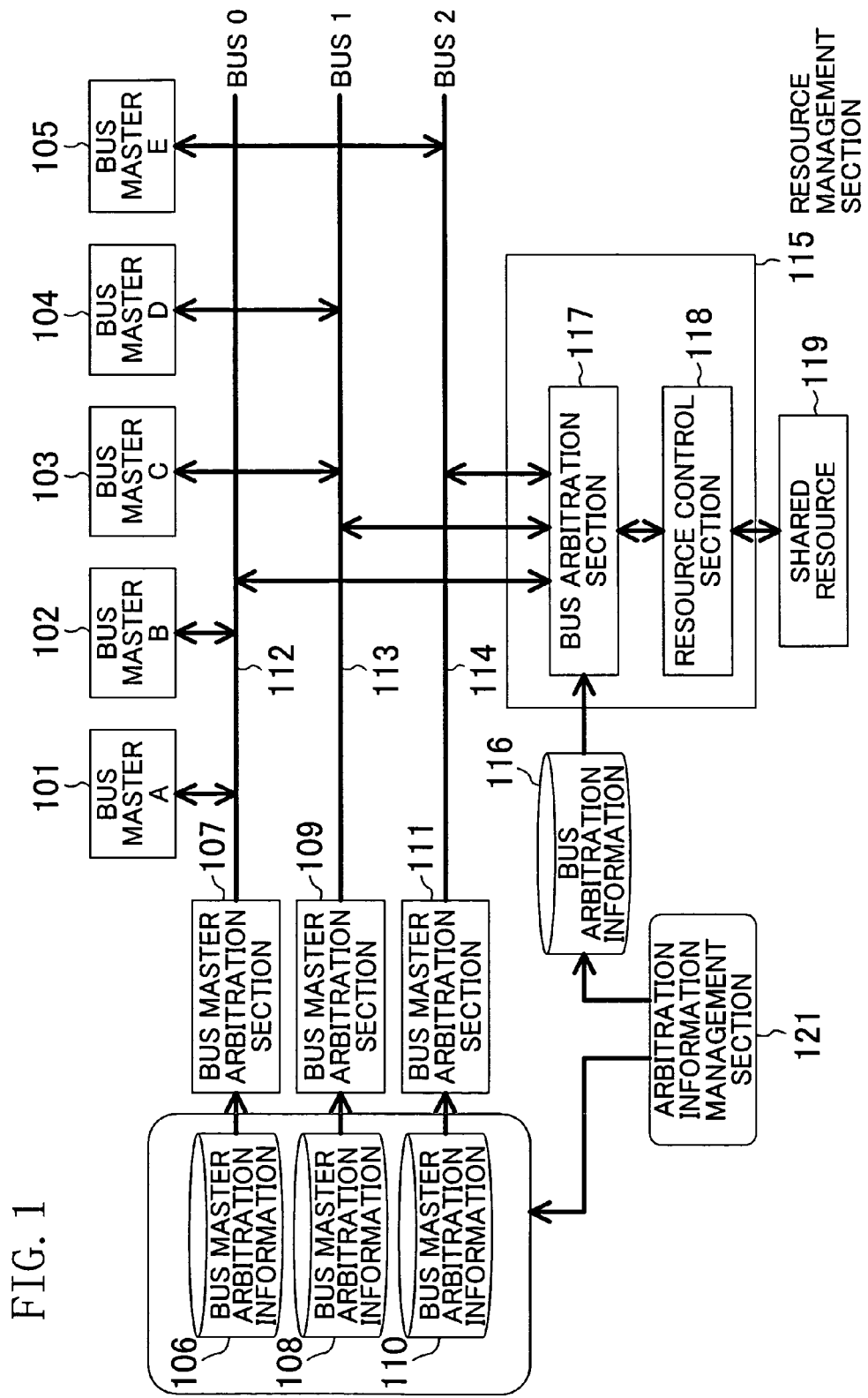
FIG. 1 is a block diagram illustrating a configuration of a resource management device according to the first embodiment of the present invention.

FIG. 1 illustrates a configuration of a resource management device according to the first embodiment of the present invention. In FIG. 1, 101, 102, 103, 104 and 105 are bus masters, 112, 113 and 114 are buses, 106, 108 and 110 are bus master arbitration information, 107, 109 and 111 are bus master arbitration sections, 115 is a resource management section, 116 is bus arbitration information, 117 is a bus arbitration section, 118 is a resource control section, 119 is a shared resource, and 121 is an arbitration information management section. The shared resource 119 is, for example, a memory such as an SDRAM (Synchronous Dynamic Random Access Memory) or a peripheral I/O controller.

The bus masters 101 to 105 can initiate a transaction for accessing the shared resource 119 via the buses 112 to 114. The bus 112 has the bus masters 101 and 102. The bus master arbitration section 107 arbitrates access requests from the bus masters 101 and 102, which are connected to the bus 112, based on the bus master arbitration information 106. The bus 113 has the bus masters 103 and 104. The bus master arbitration section 109 arbitrates access requests from the bus masters 103 and 104, which are connected to the bus 113, based on the bus master arbitration information 108. The bus 114 has the bus master 105. The bus master arbitration section 111 arbitrates access requests from the bus master 105, which is connected to the bus 114, based on the bus master arbitration information 110.

The resource management section 115 includes the bus arbitration section 117 and the resource control section 118 for controlling access to the shared resource 119 from the buses 112 to 114. The bus arbitration section 117 arbitrates access to the shared resource 119 among the buses 112 to 114 based on the bus arbitration information 116. The resource control section 118 notifies the shared resource 119 of access from the bus whose request has been granted in the arbitration operation by the bus arbitration section 117.

The arbitration information management section 121 manages the bus master arbitration information 106, 108 and 110 and the bus arbitration information 116, and updates these information as necessary in response to a change in the required access permission percentage for access to the shared resource 119 for each bus master. In the following description, the bus masters 101, 102, 103, 104 and 105 will also be referred to as bus masters A, B, C, D and E, respectively, and the buses 112, 113 and 114 will also be referred to as buses 0, 1 and 2, respectively.

In the resource management device as described above, the bus masters A to E access the shared resource 119 as follows. Each bus master requesting access to the shared resource 119 issues, to the corresponding one of the bus master arbitration sections 107, 109 and 111, a request to access the bus to which the bus master is connected. Then, the bus master arbitration sections 107, 109 and 111 each grant access to the associated bus to one of the bus masters requesting access to the bus based on the corresponding one of the bus master arbitration information 106, 108 and 110. The bus master that has been granted an access to the corresponding one of the buses 0, 1 and 2 then issues, to the bus arbitration section 117, a request to access the resource control section 118 via the associated bus. The bus arbitration section 117 grants access to the resource control section 118 to one of the requesting buses based on the bus arbitration information 116. The bus master that has been granted an access to the bus that has been granted an access to the resource control section 118 is then allowed to access the shared resource 119 via the resource control section 118.

Figure 2:
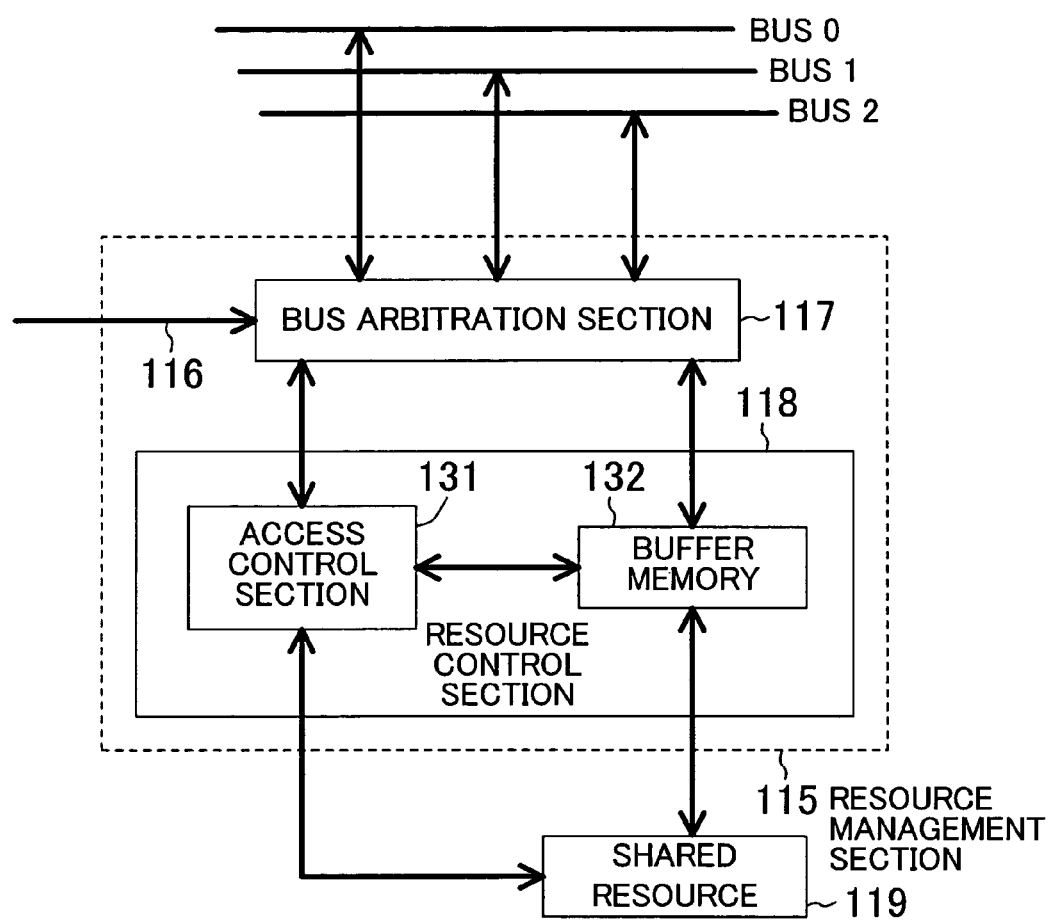
FIG. 2 is a block diagram illustrating a detailed configuration of a resource control section in FIG. 1.

FIG. 2 illustrates a detailed configuration of the resource control section 118 in FIG. 1. As illustrated in FIG. 2, the resource control section 118 includes an access control section 131 and a buffer memory 132. The access control section 131 analyzes the protocol of the bus that has been granted an access to the shared resource 119 by the bus arbitration section 117, and controls the data transfer between the bus and the shared resource 119. The buffer memory 132 temporarily stores data being transferred. The provision of the access control section 131 and the buffer memory 132 allows for adjustment of the integrity of the asynchronous operation between the operating clock of the bus and that of the shared resource 119, and enables efficient data transfer to the shared resource 119 by converting non-continuous data transfers into a continuous transfer (e.g., by converting discrete accesses into a burst access). The access control section 131 determines the arbitration status of the bus arbitration section 117 and the status of the buffer memory 132. Based on the determination results, the access control section 131 may, for example, put the access to the shared resource 119 on hold, transfer data that has been stored in the buffer memory 132 to the shared resource 119 by a predetermined unit data amount, or continuously transfer data from the shared resource 119 to the buffer memory 132 and then pass the data from the buffer memory 132 to the bus by a predetermined unit data amount.

FIG. 3 illustrates the bus arbitration information 116 in FIG. 1 in the form of a table. In the present embodiment, the bus master arbitration information 106, 108 and 110 are each a priority order pattern, and the bus arbitration information 116 is bus arbitration information 201 in the form of a table illustrated in FIG. 3.

In the bus arbitration information 201 of FIG. 3, the leftmost column represents the fixed priority order among the buses, where a bus of an upper row has a higher priority order. This corresponds to the bus priority order. The next ten columns show the highest priority order among the buses, where the bus marked with "1" has the highest priority order. This corresponds to the highest access priority pattern. These ten columns are each called a "slot", and each slot is assigned a "slot number" as shown in the top row.

The bus arbitration section 117 is referring to one slot at any point in time, and switches to the next slot for every passage of a predetermined period of time that corresponds to the temporal resolution of the access bandwidth to be guaranteed. The bus arbitration section 117 arbitrates access requests that have been received from buses within the predetermined period of time based on the information corresponding to the slot that is being referred to. While a bus issues access requests at the operating clock thereof, the slot switching period may be independent of the operating cycle of the bus. The bus arbitration section 117 selects the slots 0 to 9 cyclically, by successively selecting the slots 0 to 9 and then back to the slot 0. The arbitration performed by the bus arbitration section 117 is as follows. The bus arbitration section 117 compares the access requests that have been received within the predetermined period of time with the values in the current slot that is being referred to. Then, if there is an access request from the bus that is marked with "1" in the current slot, the bus arbitration section 117 grants the bus an access to the resource control section 118. If there is no access request from the bus that is marked with "1" in the current slot, an access is granted to one of the requesting buses that has the highest priority order, as determined based on the bus priority order. The arbitration operation as described above is repeated while switching slots to be referred to. Even if the bus arbitration section 117 receives no access request within the predetermined period of time, the slot to be referred to is switched to the next.

For example, the predetermined period of time may be determined based on the unit amount of data transferred to the shared resource 119 or based on an amount of time corresponding to a number of clock cycles. The manner in which the predetermined period of time is determined may vary for different purposes.

Figure 4:
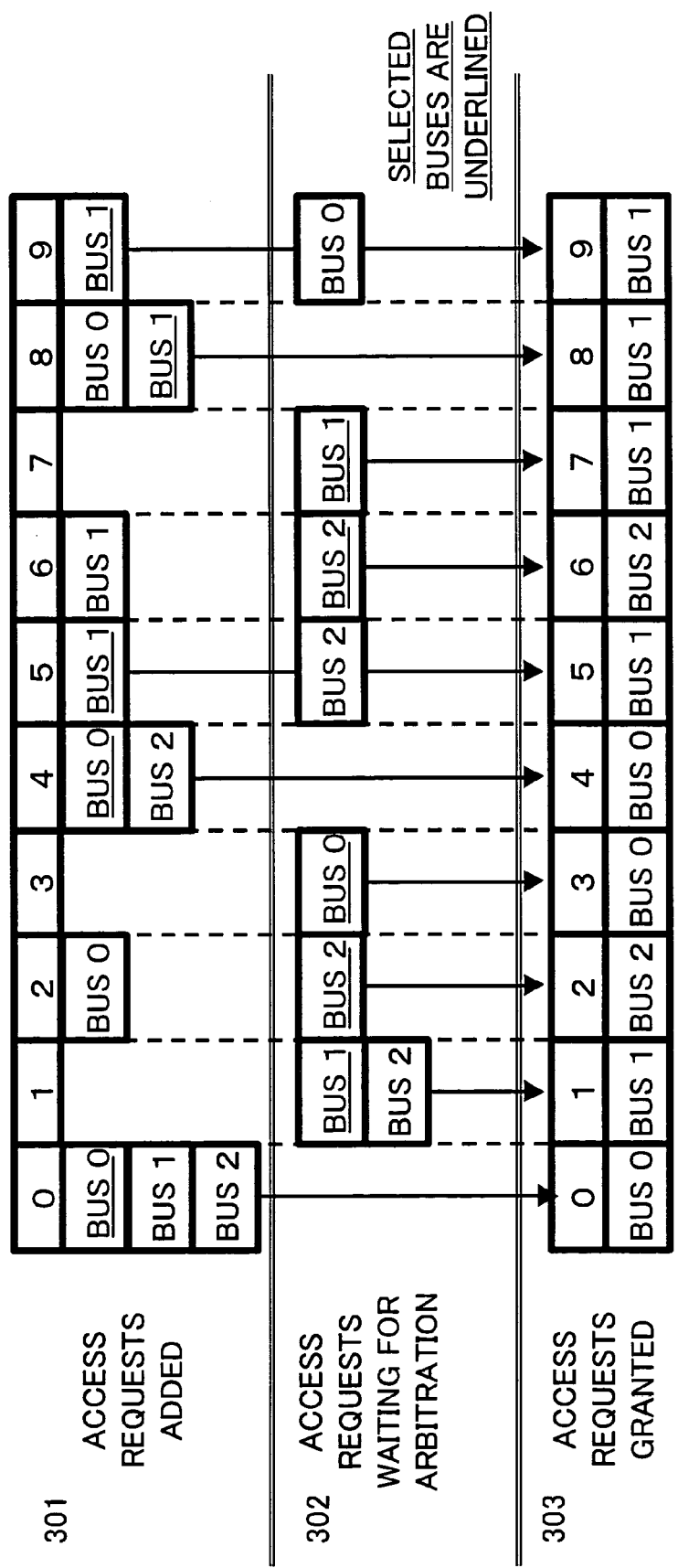
FIG. 4 illustrates a case where a bus arbitration section in FIG. 1 performs arbitration by using the bus arbitration information of FIG. 3.

FIG. 4 illustrates a case where the bus arbitration section 117 in FIG. 1 performs arbitration by using the bus arbitration information 201 of FIG. 3. In FIG. 4, 301 shows access requests added to each slot during the predetermined period of time while the slot is being referred to by the bus arbitration section 117, 302 shows access requests in each slot waiting to be granted during the predetermined period of time while the slot is being referred to by the bus arbitration section 117, and 303 shows access requests that are each granted in a slot during the predetermined period of time while the slot is being referred to by the bus arbitration section 117.

It can be seen from 301 that access requests have been issued from the buses 0, 1 and 2 during the period while the bus arbitration section 117 is referring to the slot 0. The bus arbitration section 117 grants the access request from the bus 0, which is marked with "1" in the slot 0 in the bus arbitration information 201. This is shown in 303.

The buses 1 and 2, whose access requests are not granted in the period of the slot 0, keep issuing their access requests, which are handled as "waiting for arbitration" as shown in 302 in the following period of the slot 1. In this period, no new access request is added as shown in 301. Therefore, the bus arbitration section 117 arbitrates access requests from the buses 1 and 2 waiting for arbitration as shown in 302, and grants the access request from the bus 1 based on the information for the slot 1.

In the period of the slot 2, the bus 2 and the bus 0 are arbitrated, and the bus 2 is granted an access. Thereafter, the arbitration operation is performed as described above, whereby an access is granted to one bus for every passage of a predetermined period of time.

With the bus arbitration information 201 as described above, each bus is allowed to access the shared resource 119 via the resource control section 118 a number of times that is equal to the number of slots in which the bus is marked with "1". Specifically, the bus 0, which is marked with "1" in the slots 0, 3 and 7, is granted an access in three out of ten arbitration operations, and the bus 1, which is marked with "1" in the slots 1, 4, 5, 8 and 9, is granted an access in five out of ten arbitration operations. Similarly, the bus 2, which is marked with "1" in the slots 2 and 6, is granted an access in two out of ten arbitration operations. Thus, the percentage of accesses to the shared resource 119 that will be granted to each bus among the total number of granted accesses can be specified by the bus arbitration information 201. In the illustrated example, the bus arbitration information 201 is determined so that the buses 0, 1 and 2 can gain 30%, 50% and 20%, respectively, of the total number of granted accesses to the shared resource 119.

The bus priority order, the highest access priority pattern and the number of slots, which are the contents of the bus arbitration information 201, may vary for different environments in which the resource management device is to be used, and can be determined appropriately for each environment based on the percentage of accesses that should be guaranteed for each bus in that environment.

Figure 5:
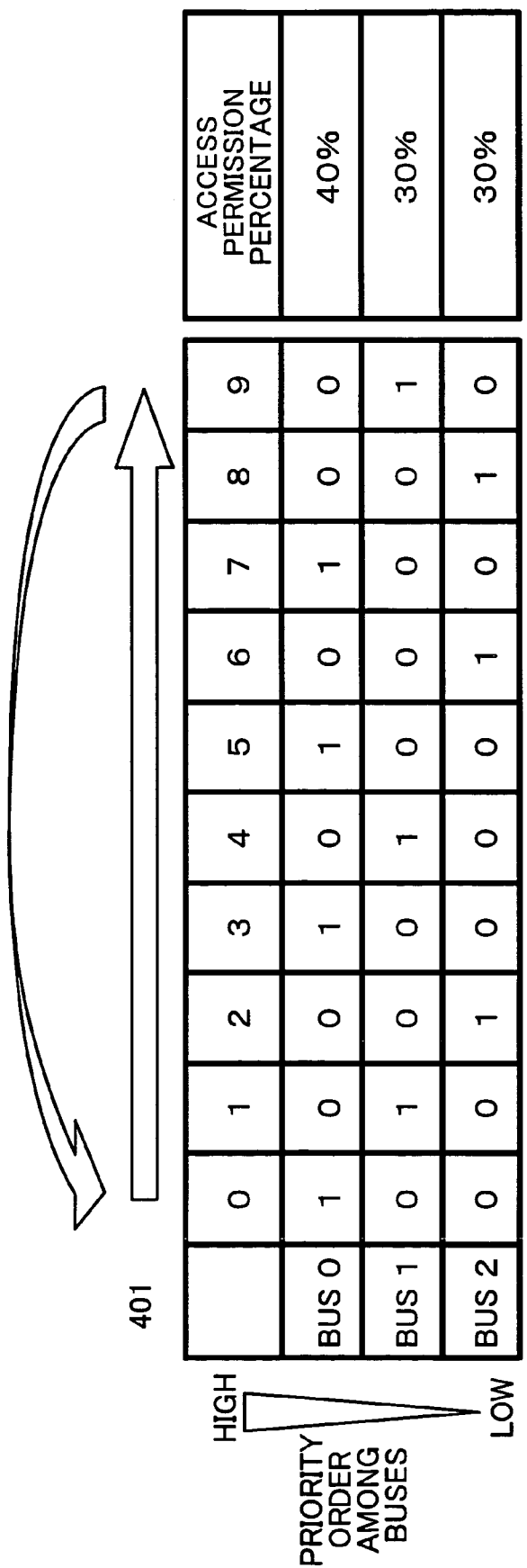
FIG. 5 illustrates alternative bus arbitration information, in which the highest access priority pattern is different from that of FIG. 3.
Figure 6:
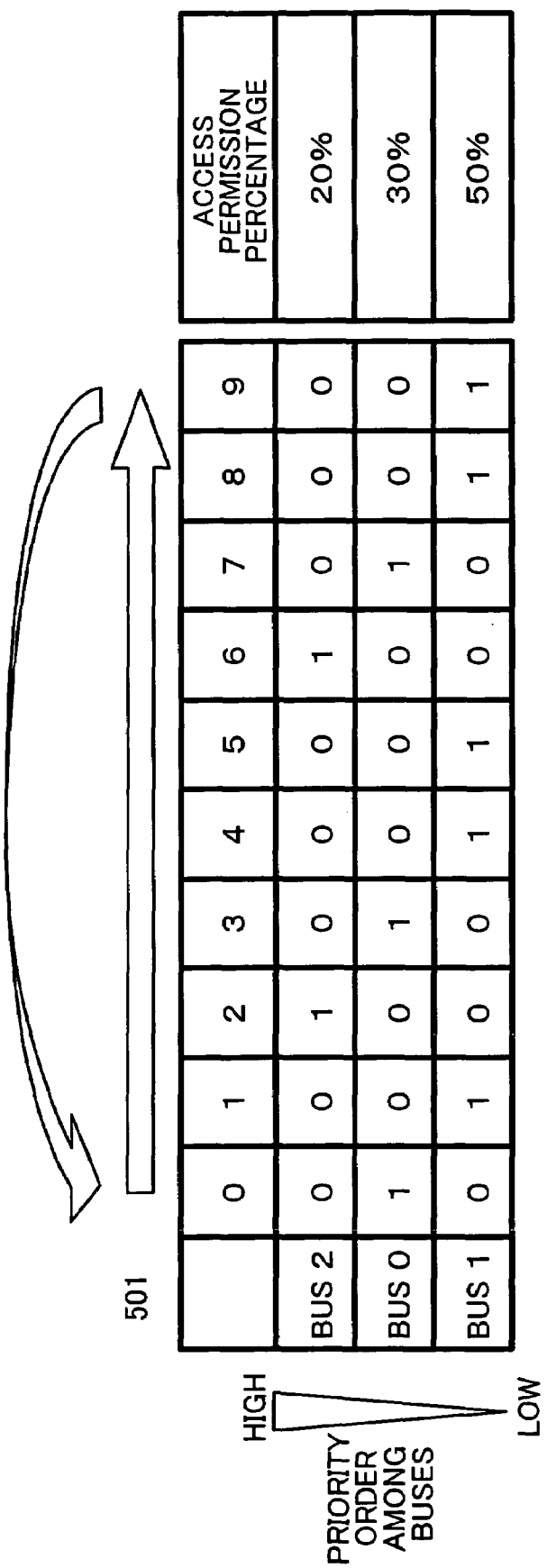
FIG. 6 illustrates alternative bus arbitration information, in which the bus priority order is different from that of FIG. 3.

FIG. 5 and FIG. 6 each illustrate a variation of the bus arbitration information 201 of FIG. 3. When there is a need to change the percentage of accesses to be granted to each bus during the operation of the present resource management device, the arbitration information management section 121 can change the bus arbitration information 201 as illustrated in FIG. 5 and FIG. 6. With bus arbitration information 401 of FIG. 5, the buses 0, 1 and 2 can gain 40%, 30% and 30%, respectively, of the total number of granted accesses to the shared resource 119. With bus arbitration information 501 of FIG. 6, the bus 2 is given the highest priority order among the buses 0, 1 and 2.

FIG. 7 illustrates a variation of the bus arbitration information 201 of FIG. 3. As illustrated in FIG. 7, with bus arbitration information 601 that includes slot information for each of read and write access operations for each bus, whereby it is possible to individually set the percentage of read accesses and the percentage of write accesses to be granted for each bus. The types of access operations for each of which the access permission rate is determined may vary for different environments in which the resource management device is to be used, and are not limited to read and write access operations.

How long a bus is allowed to access the shared resource 119 for each access permission to the resource control section 118 may vary depending on for what purpose or purposes the shared resource 119 is used in the present resource management device, and it is controlled by the resource control section 118. For example, when the bus arbitration section 117 grants an access request from a bus, the resource control section 118 allows the bus to access the shared resource 119 for a predetermined amount of data. In combination with the percentage of accesses to be granted to each bus as described above, this allows for one to calculate the amount of data for which each bus is allowed to access the shared resource 119 for a predetermined amount of time. Thus, a predetermined access bandwidth for access to the shared resource 119 can be guaranteed for each bus. The resource control section 118 can also provide other types of access control. For example, the resource control section 118 can allow the shared resource 119 to be accessed only for predetermined cycles. Thus, by the operation of the resource control section 118, it is possible to guarantee each bus a certain amount of access to the shared resource 119 according to the application of the shared resource 119.

Even when the buses operate at different speeds, it is possible to guarantee each bus a certain amount of access to the shared resource 119.

The resource control section 118 controls the access to the shared resource 119 from the bus whose request has been granted in the arbitration operation by the bus arbitration section 117. Specifically, the resource control section 118 determines the bus protocol indicating the type of access to the shared resource 119 from the bus, e.g., the burst type, the bit width, and the read/write access, and each time the bus gains access as a result of the arbitration by the bus arbitration section 117, the resource control section 118 allows for the bus to access the shared resource 119 for a predetermined unit amount of data that is allowed to be transferred per arbitration. For example, where the access from the bus to the shared resource 119 is a write access with a burst size of 8 and a bit width of 32 bits, the bit width of the access from the resource control section 118 to the shared resource 119 is 32 bits and the predetermined unit amount of data which is allowed to be transferred to the shared resource 119 per arbitration is 16 bytes, a 32-bit 4-burst data transfer is performed twice to the shared resource 119.

Thus, it is possible to quantitatively guarantee the access bandwidth from each of a plurality of buses to the shared resource 119 by arbitrating access requests to the shared resource 119 from the buses by the bus arbitration section 117 based on the bus arbitration information 116, determining the bus protocol by the resource control section 118, and allowing the shared resource 119 to be accessed for a predetermined amount of data each time an access request is granted by the bus arbitration section 117.

The access bandwidth from each bus to the shared resource 119 is determined as follows, for example. Where BCLK is the clock frequency (MHz) of the bus, and T is the number of clock cycles for each slot of the bus arbitration information 201 illustrated in FIG. 3, for example, then, the slot transition time (μs) is T/BCLK. Moreover, where TSLOT is the number of slots of the bus arbitration information 201, SSLOT is the number of slots in which the highest priority bit is set in the bus arbitration information 201 for the bus, and M is the amount of data (in bytes) per arbitration to be transferred from the bus to the shared resource 119, then, the bandwidth BW (megabytes/s), i.e., the guaranteed rate for data transfers from the bus to the shared resource 119, can be obtained as follows.

$$BW=SSLOT \cdot M \cdot BCLK/(T \cdot TSLOT)$$

Note that the number of clock cycles (T) for each slot is set to a value that reflects the characteristics of the shared resource 119 (e.g., the type of memory, and the type of access mode of SDRAM).

For example, it is possible to guarantee each bus an average access latency with the same bandwidth by equally distributing "1"s across each row in the bus arbitration information 201 of FIG. 3. Alternatively, by successively arranging "1"s in each row, it is possible to reduce the access delay when a bus master issues blocks of access requests periodically. Alternatively, by randomly arranging "1"s in each row, it is possible to realize an average access delay.

SECOND EMBODIMENT

Figure 8:
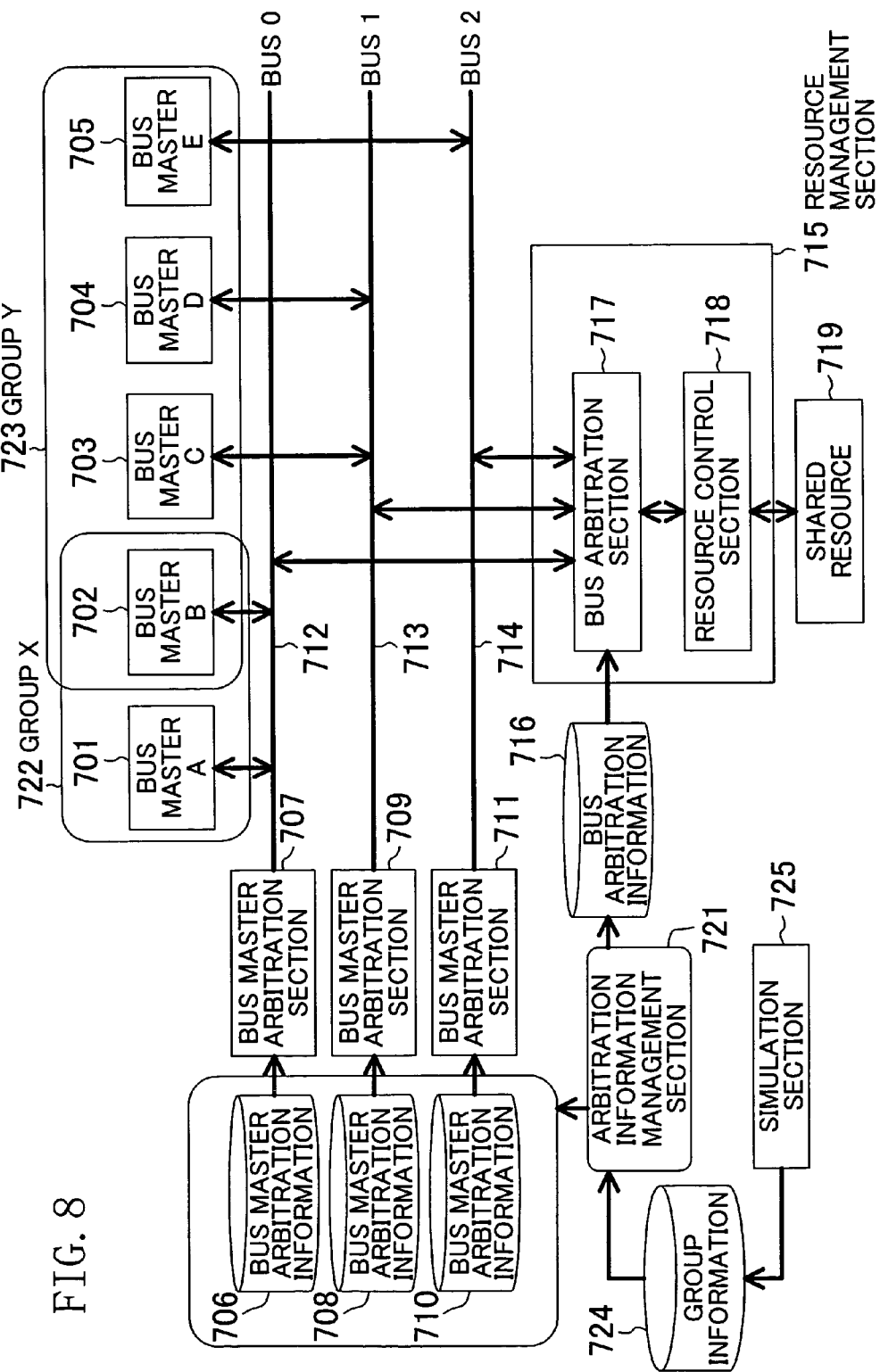
FIG. 8 is a block diagram illustrating a configuration of a resource management device according to the second embodiment of the present invention.

FIG. 8 illustrates a configuration of a resource management device according to the second embodiment of the present invention. In FIG. 8, 701 to 719 correspond to 101 to 119 in FIG. 1, respectively. An arbitration information management section 721 manages bus master arbitration information 706, 708 and 710 and bus arbitration information 716 based on group information 724, and updates these information as necessary in response to a change in the required access permission percentage for access to the shared resource 719 for each bus master. In FIG. 8, 722 is a group X including bus masters 701 and 702, 723 is a group Y including bus masters 702, 703, 704 and 705, 724 is group information storing grouping information indicating to which group each bus master belongs and information indicating the access permission percentage for access to the shared resource 719 for each group, and 725 is a simulation section.

FIG. 9 illustrates an example of the bus master arbitration information 706 and 708 and the bus arbitration information 716 in FIG. 8 each in the form of a table. As in the first embodiment, a bus arbitration section 717 performs arbitration by using bus arbitration information 921 in FIG. 9, whereby it is possible to guarantee a percentage of accesses to a resource control section 718 to be granted to each bus. Furthermore, the bus master arbitration sections 707 and 709 use bus master arbitration information 901 and 911 of FIG. 9, respectively, whereby it is possible to guarantee a percentage of accesses to the resource control section 718 to be granted to each bus. Specifically, the bus arbitration information 921 is determined so that that the buses 0, 1 and 2 can gain 20%, 50% and 30%, respectively, of the total number of granted accesses to the resource control section 718, as shown in 922. Moreover, the bus master arbitration information 901 is determined so that the bus masters A and B can each gain 50% of the total number of granted accesses to the bus 0, as shown in 902. Furthermore, the bus master arbitration information 911 is determined so that the bus masters C and D can gain 40% and 60%, respectively, of the total number of granted accesses to the bus 1, as shown in 912. Note that only the bus master E is connected to the bus 2, whereby the bus master E can gain 100% of the total number of granted accesses to the bus 2.

Since 50% of the access requests from the bus 0 to access the resource control section 718 is from the bus master A, and the remaining 50% is from the bus master B, the bus master A gains 50% of the 20% of all the granted accesses to the resource control section 718 that is gained by the bus 0, and the bus master B gains the remaining 50%. Thus, the bus masters A and B each gain 10% of all the granted accesses to the resource control section 718. Similarly, the bus masters C, D and E gain 20%, 30% and 30%, respectively, of all the granted accesses to the resource control section 718.

Moreover, as described in the first embodiment, the amount of data for which a bus is allowed to access the shared resource 719 for each access permission to the resource control section 718 can be set appropriately according to the application of the shared resource 719. Therefore, the shared resource 719 can be accessed for a predetermined amount of data for each access permission, for example, whereby a predetermined access bandwidth to the shared resource 719 is guaranteed to each bus master. Thus, once the desired access permission percentage for access to the shared resource 719 is determined for each bus master, the percentage can be guaranteed by appropriately setting the bus arbitration information 921 and the bus master arbitration information 901 and 911.

In a system where a plurality of applications are run in parallel, a predetermined access bandwidth for access to the shared resource 719 can be guaranteed for each application by using the group information 724. For example, consider a case where two applications X and Y are run in parallel. The application X uses the group X 722, including the bus masters 701 and 702, and the application Y uses the group Y 723, including the bus masters 702, 703, 704 and 705.

Figure 10:
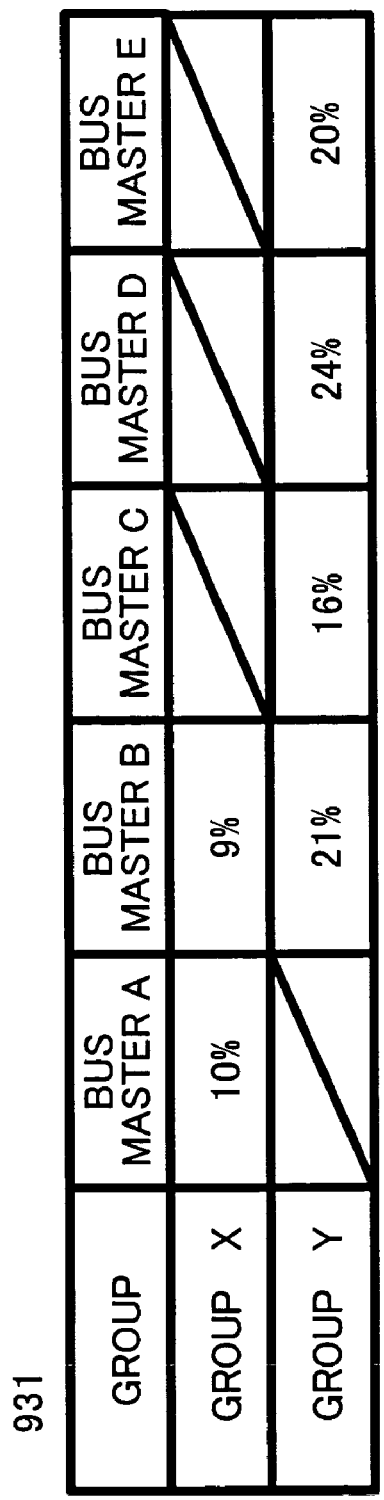
FIG. 10 illustrates an example of group information in FIG. 8.

FIG. 10 illustrates an example of the group information 724 in this case. In FIG. 10, 931 shows the combination of bus masters for each group, and how granted accesses to the shared resource 719 are distributed among bus masters of these groups. In FIG. 10, 932 shows how granted accesses to the shared resource 719 are distributed between the groups. As can be seen from 931 and 932, the access permission percentages for access to the shared resource 719 for the bus masters A, B, C, D and E are 10%, 30%, 16%, 24% and 20%, respectively. The bus master arbitration information 706, 708 and 710 and the bus arbitration information 716 can be determined appropriately as described above based on the access permission percentage for access to the shared resource 719 for each bus master.

FIG. 11 illustrates an example of the bus master arbitration information 706 and 708 and the bus arbitration information 716 obtained while taking into consideration the group information 931 and 932 of FIG. 10. In FIG. 11, 1001 and 1011 correspond to the bus master arbitration information 706 and 708, respectively, and 1021 corresponds to the bus arbitration information 716. In FIG. 11, 1002 and 1012 each show the access permission percentage for access to the corresponding bus for each bus master, and 1022 shows the access permission percentage for access to the shared resource 719 for each bus.

Thus, even in a case where a plurality of applications are run in parallel, it is possible to guarantee the access permission percentage for access to the shared resource 719 for each application, by using the group information 724. Moreover, even when there is a change in the set of applications running on the system, it is possible to change the access permission percentage for access to the shared resource 719 for each application by simply changing the group information 724.

Each application to be run on the system can be run and evaluated in advance on the simulation section 725 so as to obtain optimal group information for running the application. Such group information can then be set as the group information 724, so that the access permission percentage for access to the shared resource 719 that is optimal for running the application can be guaranteed for each bus master.

THIRD EMBODIMENT

Figure 12:
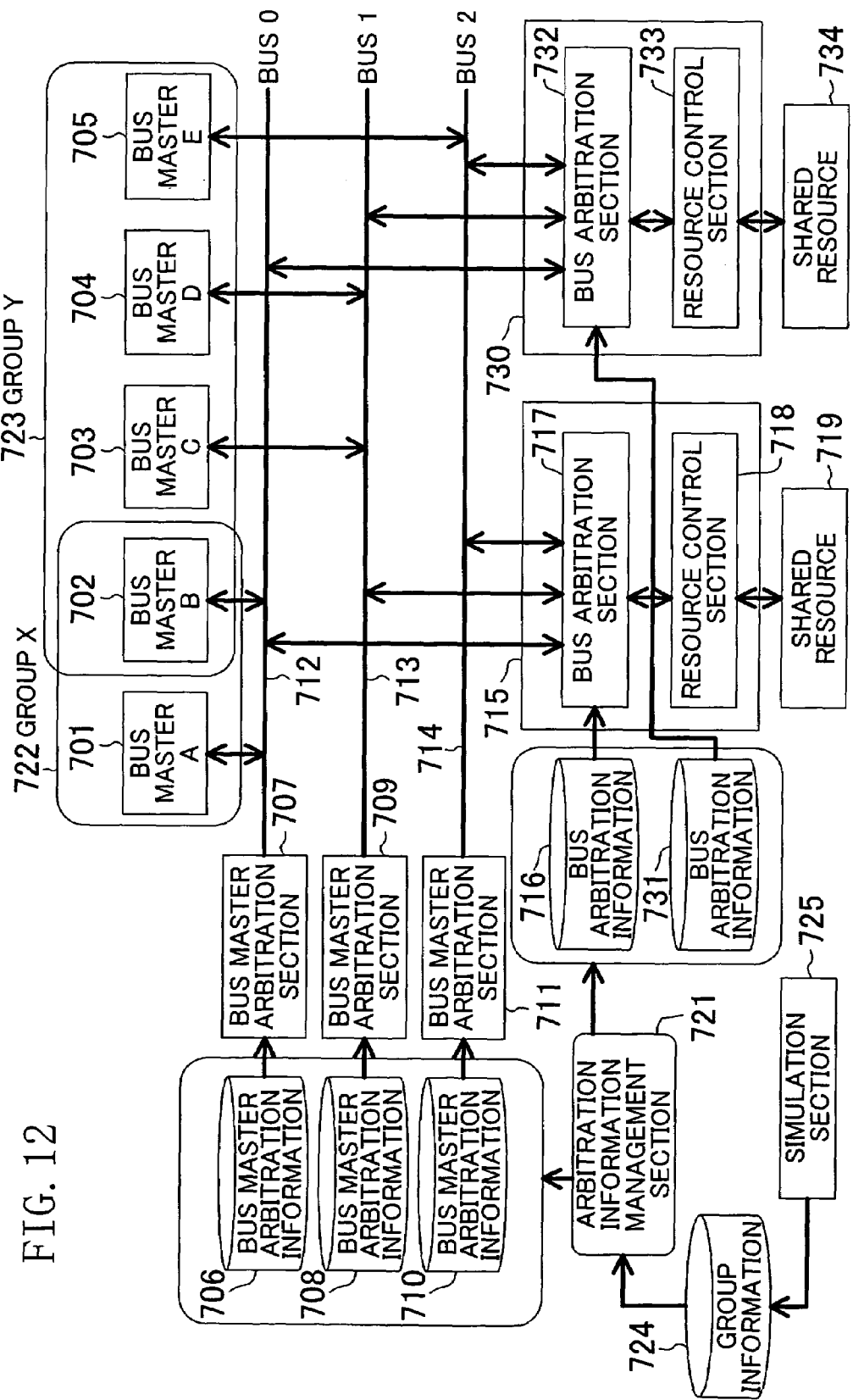
FIG. 12 is a block diagram illustrating a configuration of a resource management device according to the third embodiment of the present invention.

FIG. 12 illustrates a configuration of a resource management device according to the third embodiment of the present invention. In FIG. 12, the same components as those in the second embodiment are denoted by the same reference numerals as in FIG. 8. The components 730, 731, 732, 733 and 734 are functionally the same as 715, 716, 717, 718 and 719, respectively. Thus, FIG. 12 is a block diagram of a resource management device that has two shared resources. Although the block diagram of FIG. 12 shows a resource management device having only two shared resources 719 and 734, for the sake of simplicity, the number of shared resources is not limited to two, and the present invention can be applied to resource management devices having three or more shared resources.

Next, referring to FIG. 13 and FIG. 14, how to set the bus master arbitration information 706, 708 and 710 and the bus arbitration information 716 and 731 so that a predetermined access bandwidth for access to each shared resource from bus masters can be guaranteed for each accessing bus will be described.

Figure 13:
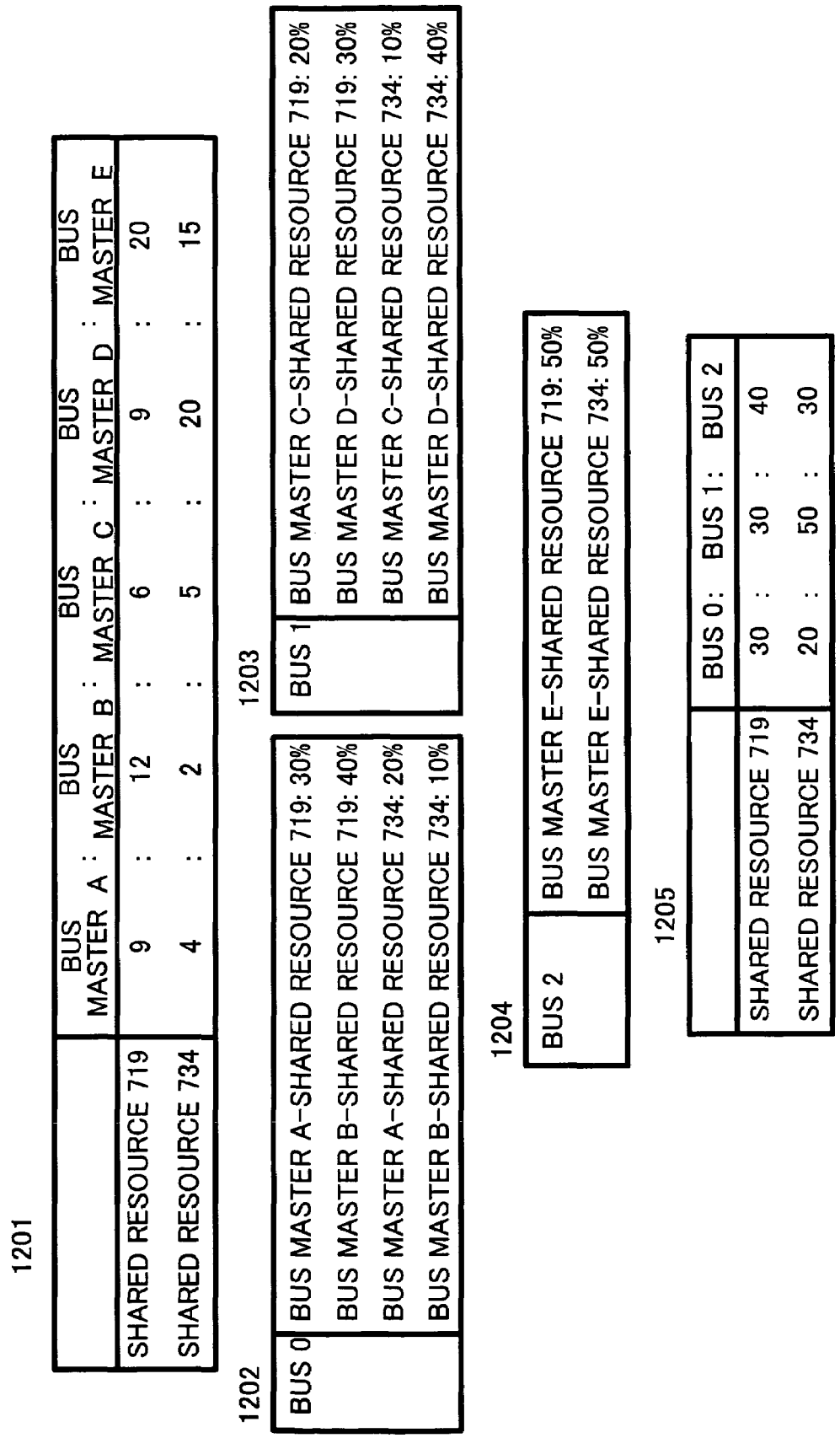
FIG. 13 is a diagram illustrating an operation in which the resource management device of FIG. 12 guarantees a bandwidth for each accessing bus.

FIG. 13 is a diagram illustrating an operation in which the resource management device of FIG. 12 guarantees a bandwidth for each accessing bus. In FIG. 13, 1201 shows the access permission percentages for accesses to each shared resource among different bus masters in the resource management device of the present embodiment. It is shown that the bus masters A, B, C, D and E are permitted to access the shared resource 719 at a ratio of 9:12:6:9:20, respectively, and are permitted to access the shared resource 734 at a ratio of 4:2:5:20:15, respectively.

In FIG. 13, 1202, 1203 and 1204 are the bus master arbitration information 706, 708 and 710, respectively, which are set based on the access permission percentages 1201. In 1202, the access permission percentage is set for each path from a bus master connected to the bus 0 to a shared resource. Similarly, in 1203, the access permission percentage is set for each path from a bus master connected to the bus 1 to a shared resource. Further, in 1204, the access permission percentage is set for each path from a bus master connected to the bus 2 to a shared resource.

Next, 1205 shows the bus arbitration information 716 and 731, which is set based on the access permission percentages 1201. In 1205, the access permission percentage for access from each bus connected to a shared resource is set for each shared resource. It can easily be seen that the access permission percentages 1201 for accesses to each shared resource among different bus masters are satisfied by setting the bus master arbitration information 706, 708 and 710 and the bus arbitration information 716 and 734 as described above. As described above, it is possible to clearly specify the access permission percentages among different paths between bus masters and shared resources by setting an access permission percentage for each path from a bus master to a shared resource in the bus master arbitration information and the bus arbitration information.

FIG. 14 illustrates an example of the bus master arbitration information 706, 708 and 710 corresponding to FIG. 13. In FIG. 14, 1301, 1302 and 1303 are examples of the bus master arbitration information 706, 708 and 710, respectively, but will not be further described below as they are similar to the information shown in FIG. 3.

Next, referring to FIG. 15 and FIG. 16, how to set the bus master arbitration information and the bus arbitration information so that a predetermined access bandwidth for access to each shared resource from bus masters can be guaranteed for each purpose of access will be described.

Figure 15:
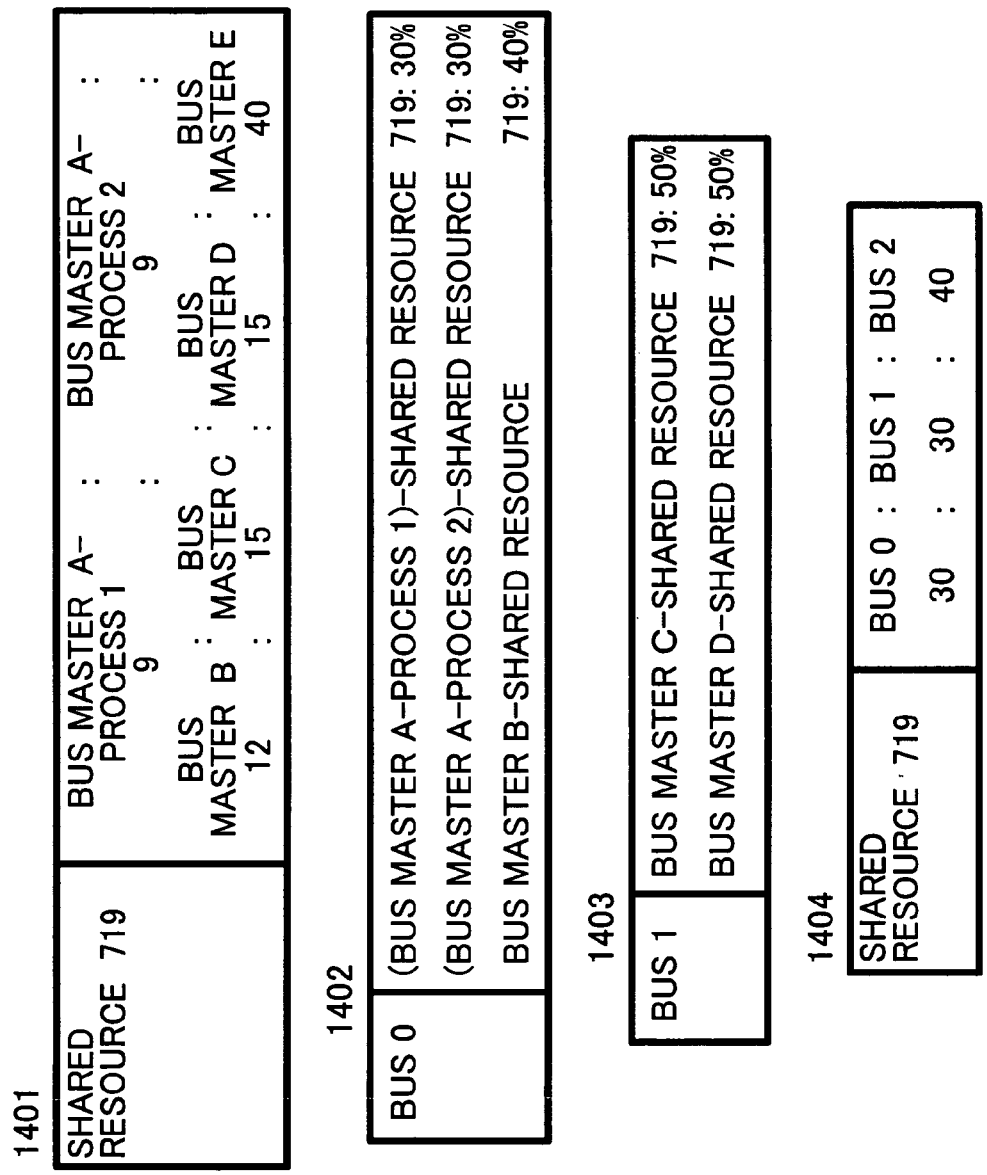
FIG. 15 is a diagram illustrating an operation in which the resource management device of FIG. 12 guarantees a bandwidth for each purpose of access.

FIG. 15 is a diagram illustrating an operation in which the resource management device of FIG. 12 guarantees a bandwidth for each purpose of access. In FIG. 15, 1401 shows the access permission percentages for accesses from the bus masters to the shared resource 719 for each purpose of access. Specifically, 1401 shows that the access permission percentages from the bus master A to the shared resource 719 for a process 1, those from the bus master A for a process 2, those from the bus master B, those from the bus master C, those from the bus master D and those from the bus master E are at the ratio of 9:9:12:15:15:40.

In FIG. 15, 1402 and 1403 are the bus master arbitration information 706 and 708, respectively, which are set based on the access permission percentages 1401. The access permission percentage for accesses from each bus master connected to the bus 0 to the shared resource is set in 1402 for each purpose of access. Similarly, access permission percentage for accesses from each bus master connected to the bus 1 to the shared resource is set in 1403 for each purpose of access. While the purpose of access is the execution of a process in the illustrated example, it may alternatively be any of various other purposes.

Next, 1404 shows the bus arbitration information 716, which is set based on the access permission percentages 1401. In 1404, the access permission percentage for access from each bus connected to a shared resource is set for each shared resource. It can easily be seen that the permission percentages 1401 for accesses to each shared resource among different bus masters are satisfied by setting the bus master arbitration information 706 and 708 and the bus arbitration information 716 as described above. As described above, it is possible to clearly specify the access permission percentages among different purposes between bus masters and shared resources by setting an access permission percentage for each purpose of access from a bus master to a shared resource in the bus master arbitration information and the bus arbitration information.

FIG. 16 illustrates an example of the bus master arbitration information 706 corresponding to FIG. 15. In FIG. 16, 1501 is an example of the bus master arbitration information 706, and will not be further described below as it is similar to the information shown in FIG. 3.

FOURTH EMBODIMENT

Figure 17:
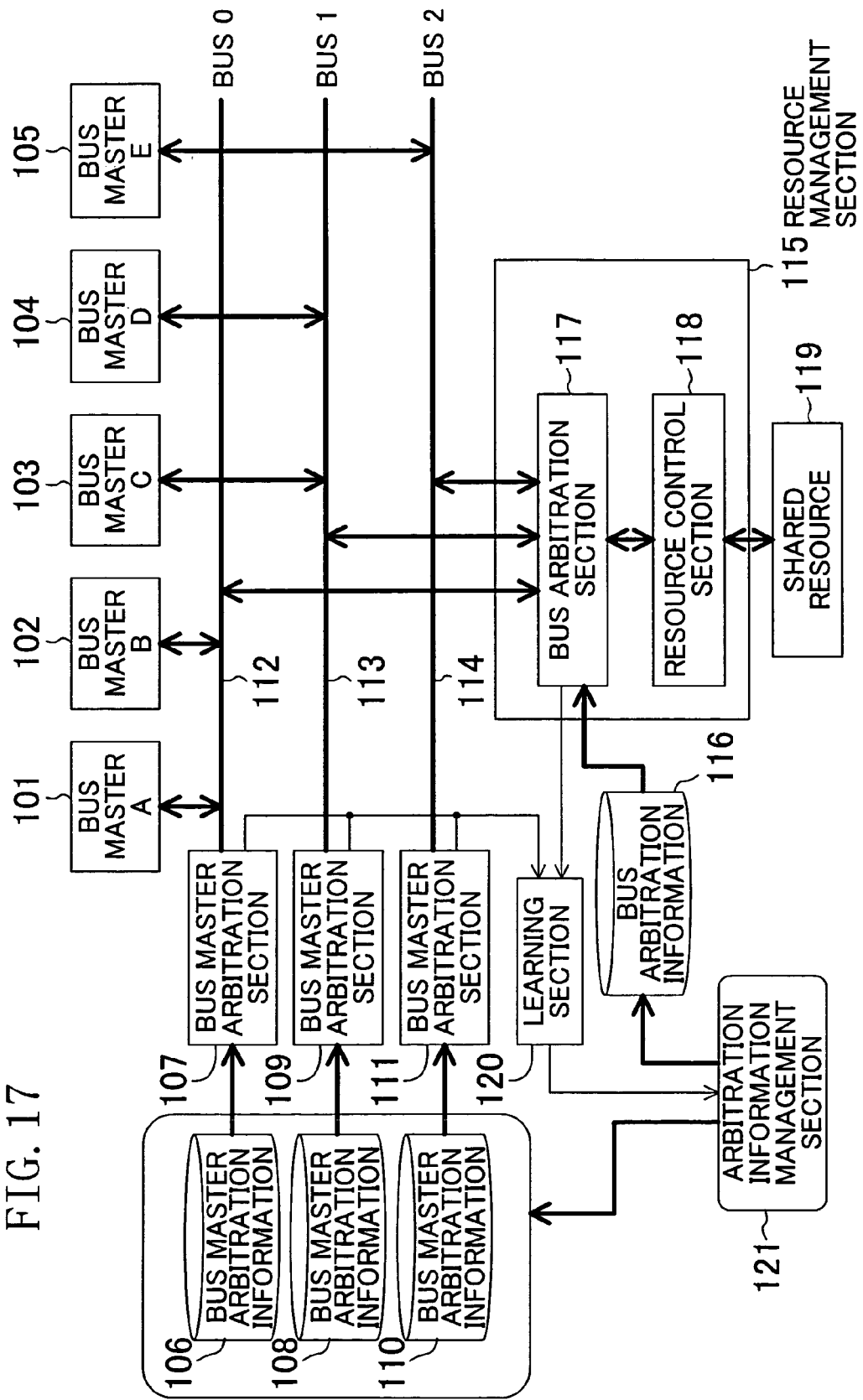
FIG. 17 is a block diagram illustrating a configuration of a resource management device according to the fourth embodiment of the present invention.

FIG. 17 illustrates a configuration of a resource management device according to the fourth embodiment of the present invention. The configuration of FIG. 17 is similar to that of FIG. 1, except that a learning section 120 is additionally provided. The learning section 120 obtains and stores various information such as the access request frequency for each of the bus masters 101 to 105, the bus access gaining frequency for each of the bus masters 101 to 105, the frequency of access to the shared resource 119 from each of the buses 112 to 114, and the shared resource access gaining frequency for each of the buses 112 to 114, from the bus master arbitration sections 107, 109 and 111 and the bus arbitration section 117. Then, the learning section 120 learns from the obtained information, and issues an instruction to the arbitration information management section 121 so that the bus masters 101 to 105 will access the shared resource 119 optimally after the learning is done. Based on the instruction from the learning section 120, the arbitration information management section 121 sets a certain piece of bus arbitration information as the bus arbitration information 116, or optimally updates the bus master arbitration information 106, 108 and 110 and the bus arbitration information 116. Again, in the following description, the bus masters 101, 102, 103, 104 and 105 will also be referred to as bus masters A, B, C, D and E, respectively, and the buses 112, 113 and 114 will also be referred to as buses 0, 1 and 2, respectively.

Figure 18:
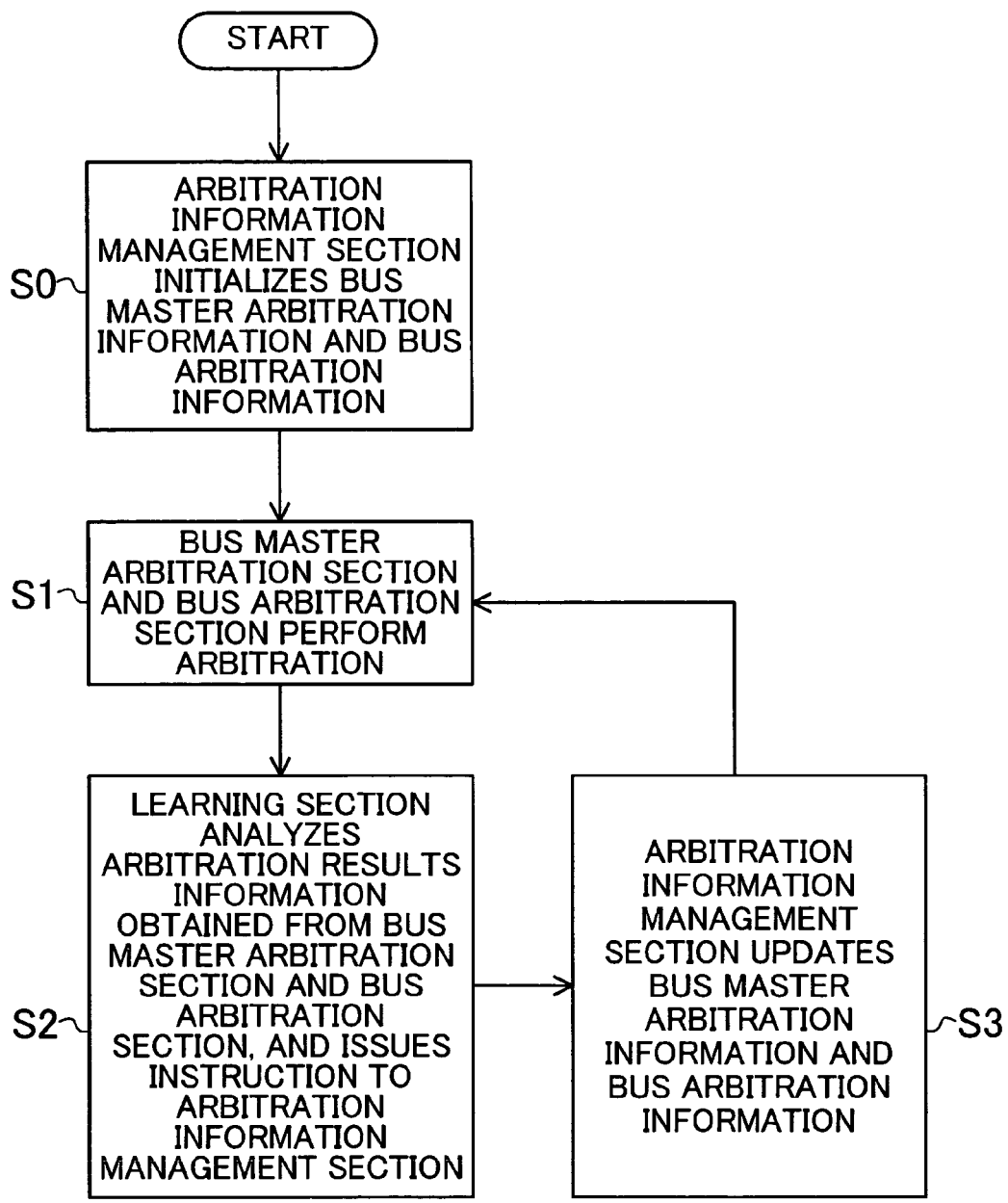
FIG. 18 is a flow chart illustrating an operation of the resource management device of FIG. 17.

FIG. 18 illustrates an operation of the resource management device of FIG. 17. Step S0 is a step of initializing the bus master arbitration information 106, 108 and 110 and the bus arbitration information 116 by the arbitration information management section 121. Step S1 is a step of performing arbitration operations by the bus master arbitration sections 107, 109 and 111 and the bus arbitration section 117. Step S2 is a step of analyzing the arbitration results information obtained from the bus master arbitration sections 107, 109 and 111 and the bus arbitration section 117 by the learning section 120, and instructing the arbitration information management section 121 based on the analysis. Step S3 is a step of updating the bus master arbitration information 106, 108 and 110 and the bus arbitration information 116 by the arbitration information management section 121 based on the instruction from the learning section 120. After Step S3 is completed, Step S1 and Step S2 are repeated and the process returns back to Step S3.

The process shown in the flow chart of FIG. 18 may continue until the end of the operation of the present device so as to dynamically update the bus master arbitration information 106, 108 and 110 and the bus arbitration information 116. Alternatively, under certain circumstances, only the analysis part may be performed while inactivating the updating step (S3), with the bus master arbitration information 106, 108 and 110 and the bus arbitration information 116 being updated subsequently to statically reflect the analysis. Moreover, when it is determined in the analysis step (S2) that it is not necessary to update the various information, the analysis step (S2) and the updating step (S3) may be inactivated.

The learning section 120 has various rules for updating the bus arbitration information, including:

(1) "multi-trial rule": a plurality of sets of bus arbitration information are tried, and one set that yields the smallest average latency among a plurality of buses is selected;

(2) "consecutive rule": if three or more consecutive access requests are issued from a certain bus within 30 arbitration operations, the bus arbitration information is updated so as to accommodate the consecutive access requests;

(3) "periodic rule": if five or more periodic access requests are issued from a plurality of buses within 30 arbitration operations, the bus arbitration information is updated so as to accommodate the periodic access requests;

(4) "temporary rule": if a certain bus gains the access for five or more consecutive times within 30 arbitration operations based on the bus priority order, the priority order of the bus is set to the lowest priority order temporarily for the following 10 arbitration operations; and (5) "pattern setting rule": 10 arbitration operations are performed based only on the bus priority order, and a highest access priority pattern is set so that it matches with the order in which buses gained access in the 10 arbitration operations.

Note that the reference number of arbitration operations to be performed for arbitration results information is not limited to any particular number, and it may also be changed dynamically.

Figure 19:
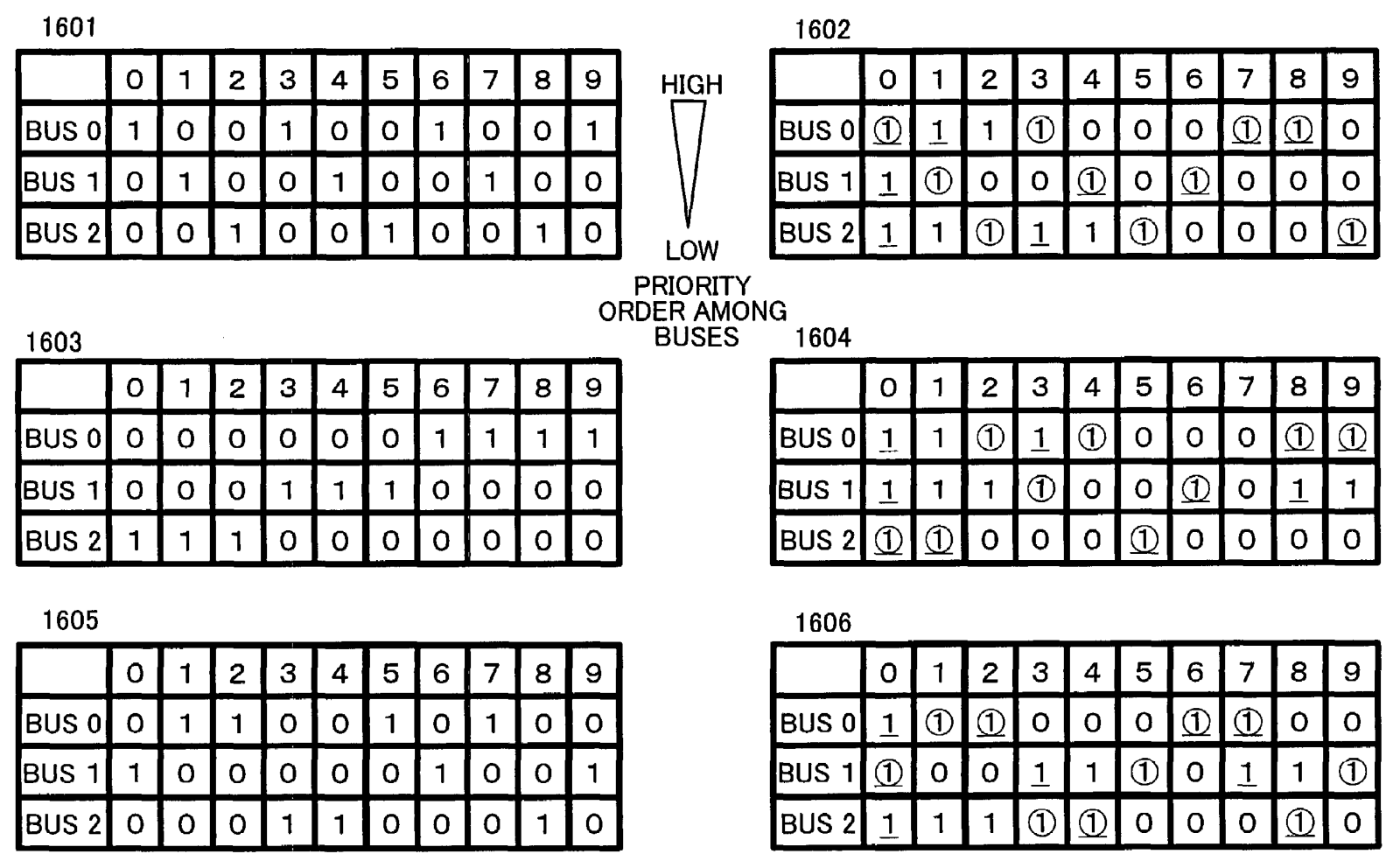

FIG. 19 illustrates a case where the "multi-trial rule" is applied to the bus arbitration information. In FIG. 19, 1601, 1603 and 1605 show bus arbitration information, and 1602, 1604 and 1606 show access requests/arbitration results. The bus arbitration information 1601, 1603 and 1605 are each in the form of a table as in FIG. 3.

In the example of FIG. 19, the bus 0 requests access to the shared resource 119 in a sequence starting with two consecutive access requests followed by three no-request slots and two consecutive access requests. The access request sequence of the bus 1 starts with a single access request followed by two no-request slots, a single access request, a single no-request slot and then a single access request. Similarly, the access request sequence of the bus 2 starts with two consecutive access requests, three no-request slots and then a single access request. In FIG. 19, 1602, 1604 and 1606 show the access requests/arbitration results based on the bus arbitration information 1601, 1603 and 1605, respectively, in a case where access requests are issued in such sequences as described above. In the access request/arbitration results 1602, 1604 and 1606, "0" indicates that an access request is not being issued in the slot. The designation "1" underlined indicates that an access request is first issued in the slot. The designation "1" circled indicates that an access request is granted in the slot. The designation "1" underlined and circled indicates that an access request is first issued and granted in the same slot. The designation "1" without an underline and without a circle indicates that the access request has been issued since the last slot or before.

In the access request/arbitration results 1602, 1604, 1606, each un-circled "1" (with or without an underline) indicates that an access request has been issued and has not been granted. The more there are un-granted access requests, the larger the average latency among the buses 0 to 2 is. Therefore, the learning section 120 analyzes the access request/arbitration results 1602, 1604 and 1606 for the bus arbitration information 1601, 1603 and 1605, respectively, so as to select the bus arbitration information that yields the smallest average latency, and issues an instruction to the arbitration information management section 121.

In the example of FIG. 19, there are seven un-circled "1"s (with or without an underline) in the access request/arbitration results 1602, eight in 1604, and eight also in 1606. Therefore, the bus arbitration information 1601 is determined to be optimal, and is thus selected, among the bus arbitration information 1601, 1603 and 1605 in this example.

Figure 20:
FIG. 20 illustrates a case where the "consecutive rule" is applied to the bus arbitration information in the resource management device of FIG. 17.

FIG. 20 illustrates a case where the "consecutive rule" is applied to the bus arbitration information. In FIG. 20, 1701 shows the bus arbitration information before being updated. In FIG. 20, 1702 shows the access request/arbitration results obtained by the learning section 120 accumulating the arbitration results information from the bus arbitration section 117 for the last 30 arbitration operations based on the bus arbitration information 1701. In FIG. 20, 1703 shows the updated bus arbitration information.

It can be seen from the access request/arbitration results 1702 that the bus 1 has issued four consecutive access requests in the slots 0 to 7. Herein, the term "consecutive access request" refers to an access request that is issued in a slot following another slot in which the previous access request has been granted in an arbitration operation. Also in the slots 10 to 17 and in the slots 20 to 27, four consecutive access requests are issued, as in the slots 0 to 7. Thus, it can be seen that the bus 1 has issued four consecutive access requests three times within the last 30 arbitration operations. Therefore, the learning section 120 instructs the arbitration information management section 121 to update the bus arbitration information 116 according to the "consecutive rule". In the example of FIG. 20, the bus arbitration information 116 is updated to the bus arbitration information 1703 by the arbitration information management section 121.

FIG. 21 illustrates a case where the "periodic rule" is applied to the bus arbitration information. In FIG. 21, 1801 shows the bus arbitration information before being updated. In FIG. 21, 1802 shows the access request/arbitration results obtained by the learning section 120 accumulating the arbitration results information from the bus arbitration section 117 for the last 30 arbitration operations based on the bus arbitration information 1801. In FIG. 21, 1803 shows the updated bus arbitration information.

It can be seen from the access request/arbitration results 1802 that access requests are issued from the buses 0, 1 and 2 in this order in the slots 0 to 2. Moreover, it can be seen that access requests are issued from the buses 0, 1 and 2 in this order also in the slots 5 to 8, the slots 10 to 12, the slots 15 to 18, the slots 20 to 22 and the slots 25 to 28, as in the slots 0 to 2. Thus, it can be seen from the access request/arbitration results 1802 that access requests are issued from the buses 0, 1 and 2 in this order six times at a cycle of five slots for the last 30 arbitration operations. Therefore, the learning section 120 instructs the arbitration information management section 121 to update the bus arbitration information 116 according to the "periodic rule". In the example of FIG. 21, the bus arbitration information 116 is updated to the bus arbitration information 1803 by the arbitration information management section 121.

FIG. 22 illustrates a case where the "temporary rule" is applied to the bus arbitration information. In FIG. 22, 1901 shows the bus arbitration information before being updated. In FIG. 22, 1902 shows the access request/arbitration results obtained by the learning section 120 accumulating the arbitration results information from the bus arbitration section 117 for the last 30 arbitration operations based on the bus arbitration information 1901. In FIG. 22, 1903 shows the bus arbitration information that is temporarily employed instead of the bus arbitration information 1901.

The access request/arbitration results 1902 shows that in the slots 0, 1, 4, 10, 11, 14, 20, 21 and 24, access requests are issued simultaneously from the buses 0 and 1 and are arbitrated according to the bus priority order of the bus arbitration information 1901. As a result of arbitration, the bus 0 is granted an access in these slots. In the example of FIG. 22, the bus 1 is never granted an access when the bus 0 and the bus 1 are arbitrated based on the bus priority order. Therefore, the learning section 120 instructs the arbitration information management section 121 to update the bus arbitration information 116 according to the "temporary rule". In the example of FIG. 22, the bus arbitration information 116 is updated by the arbitration information management section 121 to the bus arbitration information 1903 that specifies a bus priority order of 1, 2, 0. Then, 10 arbitration operations are performed by using the bus arbitration information 1903 in the slots 30 to 39 (not shown), after which the bus arbitration information 116 is switched back to the original bus arbitration information 1901.

Figure 23:
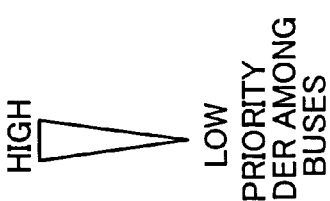
FIG. 23 illustrates a case where the "pattern setting rule" is applied to the bus arbitration information in the resource management device of FIG. 17.

FIG. 23 illustrates a case where the "pattern setting rule" is applied to the bus arbitration information. In FIG. 23, 2001 shows bus arbitration information without the highest access priority pattern, where only the bus priority order is set. In FIG. 23, 2002 shows the access request/arbitration results obtained by the learning section 120 accumulating the arbitration results information from the bus arbitration section 117 for the last 10 arbitration operations based on the bus arbitration information 2001. In FIG. 23, 2003 shows the updated bus arbitration information.

In the access request/arbitration results 2002, there is only an access request from the bus 0 in the slot 0. Then, the bus 0 is granted an access according to the bus priority order. The learning section 120 keeps track of which bus gains access in each slot. Then, after arbitration operations for all the slots 0 to 9 have been performed based on the bus priority order, the highest access priority pattern of the bus arbitration information 116 is set so that it matches with the order in which buses gained access in the arbitration operations. In the example of FIG. 23, the bus arbitration information 2003 is the bus arbitration information 116 after the highest access priority pattern has been set.

Although the bus master arbitration information 106, 108 and 110 have not been discussed in the description above, they may similarly be updated as is the bus arbitration information 116.

Figure 24:
FIG. 24 illustrates a case where the "consecutive rule" is applied to the bus master arbitration information in the resource management device of FIG. 17.

FIG. 24 illustrates a case where the "consecutive rule" is applied to the bus master arbitration information 106. In FIG. 24, 2101 shows the bus master arbitration information before being updated. In FIG. 24, 2102 shows the access request/arbitration results obtained by the learning section 120 accumulating the arbitration results information from the bus master arbitration section 107 for the last 30 arbitration operations based on the bus master arbitration information 2101. In FIG. 24, 2103 shows the updated bus master arbitration information.

It can be seen from the access request/arbitration results 2102 that the bus master A has issued three consecutive access requests in the slots 0 to 5. Also in the slots 10 to 15 and the slots 20 to 25, three consecutive access requests have been issued, as in the slots 0 to 5. Thus, it can be seen that the bus master A has issued three consecutive access requests three times within the last 30 arbitration operations. Therefore, the learning section 120 instructs the arbitration information management section 121 to update the bus master arbitration information 106 according to the "consecutive rule". In the example of FIG. 24, the bus master arbitration information 106 is updated by the arbitration information management section 121 to the bus master arbitration information 2103.

Note that while three buses (the buses 0 to 2) are used in FIG. 17, the number of buses is not limited to any particular number. Moreover, while two bus masters are connected to each of the buses 0 and 1 and one bus master to the bus 2 in the illustrated configuration, the number of bus masters to be connected to each bus is not limited to any particular number, and different numbers of bus masters may be connected to different buses. Moreover, while a single shared resource 119 is connected to the buses 0 to 2 in the illustrated configuration, the number of resources is not limited to any particular number, and different numbers of resources may be connected to different buses. Moreover, while the description above has been directed to a configuration with bus master(s) and shared resource(s), it can similarly be applied to a configuration with circuit block(s) functioning both as a bus master and as a shared resource. These points are true also in the preceding embodiments. In addition, each bus master arbitration section and each bus arbitration section may have an individual learning section.

Figure 25:
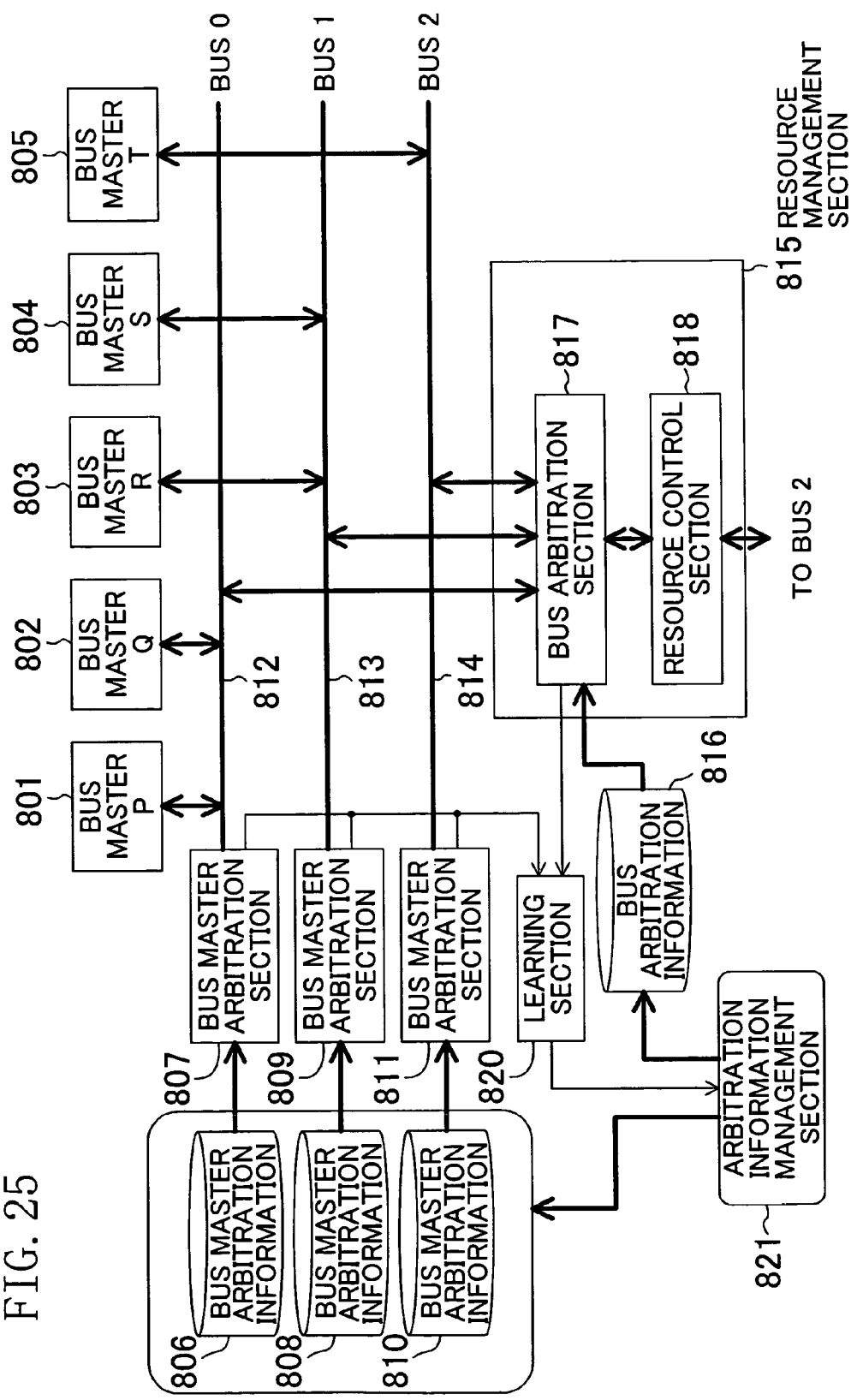
FIG. 25 is a block diagram illustrating an extended variation of the resource management device of FIG. 17.

FIG. 25 illustrates an extended variation of the resource management device of FIG. 17. In this extended variation, the bus master 105 of FIG. 17 is replaced with the configuration shown in FIG. 25. The components 801 to 818, 820 and 821 in FIG. 25 correspond to 101 to 118, 120 and 121 in FIG. 17, respectively. The buses 812, 813 and 814 (buses 3, 4 and 5) in FIG. 25 are upper buses with respect to the buses 0, 1 and 2 in FIG. 17. Thus, the configuration as a whole has a multi-layer bus architecture. The bus masters 801 to 805 (upper bus masters P, Q, R, S and T) in FIG. 25 each access the shared resource 119 in FIG. 17 via one of the buses 3 to 5 and via the bus 2. Also with such a configuration, a predetermined access bandwidth for access to the shared resource 119 can be guaranteed for each of the buses 0 to 5.

The resource control section 818 in FIG. 25 functions to convert the protocol of an access from a bus whose request has been granted in an arbitration operation by the bus arbitration section 817 into the protocol suitable for accessing the bus 2. The resource control section 818 may also have a function of optimizing transactions of upper-level buses. Specifically, it may convert discrete accesses from the upper bus masters P to T into burst accesses, which can easily be implemented. Moreover, the resource control section 818 may be unnecessary when the protocol of the transaction from the bus arbitration section 817 is the same as those of the transactions of the lower buses 112 to 114.

Note that while a single resource control section 818 is used as a bus master to the bus 2 in the example of FIG. 25, there may be a plurality of resource control sections 818, and a plurality of resource control sections 818 may be connected to a single bus. The resource control section 818 may be connected to a bus together with other bus masters that are connected to the same bus.

What is claimed is:

1. A resource management device in a data processing system, in which at least one bus master is connected to each of a plurality of buses, with each bus master being connected to at least one shared resource via one of the plurality of buses, the resource management device comprising:
an arbitration information management section for managing, as bus arbitration information, a bus priority order which is a fixed priority order among the plurality of buses and a highest access priority pattern which indicates a highest priority in each time slot among the plurality of buses;
a bus arbitration section for arbitrating accesses from the plurality of buses to the shared resource based on the bus priority order and the highest access priority pattern; and
a resource control section for controlling an access to the shared resource from the bus whose access request has been granted by the bus arbitration sections,
wherein, in each time slot, if there is an access request from a bus which has the highest priority indicated by the highest access priority pattern, the bus arbitration section grants the bus which has the highest priority an access to the shared resource, and if not, the bus arbitration section determines a bus to be granted access to the shared resource according to the bus priority order.

2. The resource management device of claim 1, wherein the resource control section includes:
an access control section for analyzing a data transfer protocol of the bus whose access request has been granted by the bus arbitration section and for controlling a data transfer operation between the bus and the shared resource based on the analysis; and
a buffer memory for temporarily storing data to be transferred to or from the shared resource.

3. The resource management device of claim 1, wherein the arbitration information management section has a function of updating at least one of the bus priority order and the highest access priority pattern of the bus arbitration information.

4. The resource management device of claim 1, wherein the bus arbitration information is arranged so that different types of access to the shared resource are distinguished from one another.

5. The resource management device of claim 1, wherein the bus master connected to one of the plurality of buses has a structure in which at least one upper bus master is connected to each of a plurality of upper busses.

6. The resource management device of claim 1, wherein:
a plurality of bus masters are connected to at least one of the plurality of buses, and the at least one bus includes a bus master arbitration section for arbitrating bus requests from the plurality of bus masters; and
the arbitration information management section further has a function of managing, as bus master arbitration information, a bus master priority order and a highest access priority pattern for ensuring a predetermined access bandwidth to the shared resource for each of the plurality of bus masters for an arbitration operation by the bus master arbitration section.

7. The resource management device of claim 1, further comprising a learning section for, after the arbitration information management section initializes the bus arbitration information, obtaining arbitration results information for a predetermined number of arbitration operations by the bus arbitration section, analyzing a status of access to the shared resource based on the arbitration results information, and instructing the arbitration information management section to update the bus arbitration information so as to reduce a latency in accessing the shared resource based on the analysis.

8. The resource management device of claim 6, wherein the arbitration information management section further has a function of managing the bus master arbitration information and the bus arbitration information so as to reflect the requested access bandwidth to the shared resource for each of the bus masters.

9. The resource management device of claim 6, wherein each bus master or each bus is assigned a highest priority order at regular intervals by the highest access priority pattern.

10. The resource management device of claim 6, wherein each bus master or each bus is assigned a highest priority order consecutively by the highest access priority pattern.

11. The resource management device of claim 6, wherein each bus master or each bus is assigned a highest priority order randomly by the highest access priority pattern.

12. The resource management device of claim 6, wherein:
there is at least one group in which one or more of the bus masters operate cooperatively with one another; and
the arbitration information management section further has a function of managing the bus master arbitration information and the bus arbitration information so as to reflect group information that contains a requested resource access bandwidth for each bus master in each group.

13. The resource management device of claim 6, further comprising a simulation section for simulating an operation of the data processing system so as to produce group information that stores grouping information of the plurality of bus masters and access permission percentage information indicating a percentage of access to the shared resource granted to the bus masters of each group.

14. The resource management device of claim 6, wherein:
the data processing system includes a plurality of shared resources; and
the arbitration information management section further has a function of managing the bus master arbitration information and the bus arbitration information so as to reflect a requested resource access bandwidth for each bus master for each shared resource.

15. The resource management device of claim 6, wherein the arbitration information management section further has a function of managing the bus master arbitration information and the bus arbitration information so as to reflect a requested resource access bandwidth for each bus master for each purpose of access to the shared resource.

16. The resource management device of claim 7, wherein:
a plurality of bus masters are connected to at least one of the plurality of buses, and the at least one bus includes a bus master arbitration section for arbitrating bus requests from the plurality of bus masters; and
the arbitration information management section further has a function of managing bus master arbitration information for an arbitration operation by the bus master arbitration section; and
the learning section further has a function of, after the arbitration information management section initializes the bus master arbitration information, obtaining arbitration results information for a predetermined number of arbitration operations by the bus master arbitration section, analyzing a status of access to the shared resource from the plurality of bus masters based on the arbitration results information, and instructing the arbitration information management section to update the bus master arbitration information so as to reduce a latency in accessing the shared resource based on the analysis.

17. The resource management device of claim 7, wherein the arbitration information management section has a function of updating at least one of the bus priority order and the highest access priority pattern of the bus arbitration information.

18. The resource management device of claim 7, wherein the learning section has a function of instructing the arbitration information management section to select one set of bus arbitration information that minimizes an average latency among the plurality of buses, after trying a plurality of sets of bus arbitration information.

19. The resource management device of claim 7, wherein the learning section has a function of, if a predetermined number or more of consecutive access requests are issued from one of the plurality of buses within the predetermined number of arbitration operations, instructing the arbitration information management section to update the bus arbitration information so as to accommodate the consecutive access requests.

20. The resource management device of claim 7, wherein the learning section has a function of, if a predetermined number or more of periodic access requests are issued from the plurality of buses within the predetermined number of arbitration operations, instructing the arbitration information management section to update the bus arbitration information so as to accommodate the periodic access requests.

21. The resource management device of claim 7, wherein the learning section has a function of, if one of the plurality of buses gains access for a predetermined number or more of consecutive times within the predetermined number of arbitration operations, instructing the arbitration information management section to temporarily lower a priority order of the bus.

22. The resource management device of claim 7, wherein the learning section has a function of, after the predetermined number of arbitration operations are performed based only on the bus priority order, setting the highest access priority pattern so that the highest access priority pattern matches with an order in which the buses gained access in the predetermined number of arbitration operations.

23. The resource management device of claim 7, wherein the bus master connected to one of the plurality of buses has a structure in which at least one upper bus master is connected to each of a plurality of upper busses.

* * * * *